United States Patent
Honda et al.

(10) Patent No.: US 9,023,572 B2
(45) Date of Patent: May 5, 2015

(54) METHOD FOR PRODUCING TONER FOR DEVELOPING ELECTROSTATIC IMAGE AND APPARATUS FOR PRODUCING RESIN PARTICLES

(75) Inventors: Takahiro Honda, Shizuoka (JP); Yohichiroh Watanabe, Shizuoka (JP); Yasutada Shitara, Shizuoka (JP); Yoshihiro Norikane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1003 days.

(21) Appl. No.: 12/784,906

(22) Filed: May 21, 2010

(65) Prior Publication Data

US 2010/0297548 A1   Nov. 25, 2010

(30) Foreign Application Priority Data

May 25, 2009   (JP) .................................. 2009-124795

(51) Int. Cl.
*G03G 9/08* (2006.01)
*B01J 19/06* (2006.01)
*B01J 4/00* (2006.01)
*C08J 3/12* (2006.01)
*G03G 9/16* (2006.01)
*G03G 9/18* (2006.01)

(52) U.S. Cl.
CPC  *B01J 19/06* (2013.01); *B01J 4/002* (2013.01); *B01J 4/007* (2013.01); *B01J 2219/00123* (2013.01); *C08J 3/122* (2013.01); *G03G 9/0804* (2013.01); *G03G 9/16* (2013.01); *G03G 9/18* (2013.01)

(58) Field of Classification Search
CPC ......... G03G 9/0804; G03G 9/18; G03G 9/16; B01J 4/002; B01J 19/06; B01J 2219/00123; B01J 4/007; C08J 3/122

USPC .............. 430/137.1; 528/502 E; 34/314, 372; 523/340, 342
See application file for complete search history.

(56) References Cited

U.S. PATENT DOCUMENTS 2,333,333 A * 11/1943 Peebles et al. ............... 159/4.03
2,636,555 A *  4/1953 Klepetko et al. ............. 159/4.1
5,596,817 A *  1/1997 Hansen ......................... 34/373

(Continued)

FOREIGN PATENT DOCUMENTS

GB    1514824(A)   *  6/1978  ............... B01D 1/18
JP    57-201248       12/1982

(Continued)

*Primary Examiner* — Christopher Rodee
*Assistant Examiner* — Omar Kekia
(74) *Attorney, Agent, or Firm* — Oblon, McClelland, Maier & Neustadt, L.L.P.

(57) ABSTRACT

A method for producing resin particles, including ejecting a liquid containing at least a resin in the form of droplets from a droplet ejecting unit having a plurality of holes provided in a part of a flow channel for feeding the liquid containing at least a resin, and drying and solidifying the ejected droplets so as to obtain the resin particles, while the ejected droplets are transported by a primary transport air flow flowing in the direction in which the droplets are ejected, wherein the ejected droplets are further transported by a secondary transport air flow which transports the ejected droplets in a different direction from a direction in which the primary transport air flow flows, and wherein a smaller angle of angles formed between a velocity vector of the primary transport air flow and a velocity vector of the secondary transport air flow is less than 120 degrees.

15 Claims, 8 Drawing Sheets

(56) References Cited

U.S. PATENT DOCUMENTS

| | | |
|---|---|---|
| 2008/0063971 A1* | 3/2008 | Watanabe et al. .......... 430/110.4 |
| 2008/0227011 A1* | 9/2008 | Kuramoto et al. ......... 430/108.3 |
| 2008/0286679 A1 | 11/2008 | Norikane et al. |
| 2008/0292985 A1 | 11/2008 | Suzuki et al. |
| 2009/0117486 A1 | 5/2009 | Watanabe et al. |
| 2009/0239170 A1* | 9/2009 | Honda et al. ............... 430/108.8 |
| 2009/0317738 A1 | 12/2009 | Honda et al. |
| 2009/0325100 A1 | 12/2009 | Watanabe et al. |
| 2010/0003613 A1 | 1/2010 | Honda et al. |
| 2010/0021209 A1 | 1/2010 | Watanabe et al. |
| 2010/0055590 A1 | 3/2010 | Honda et al. |

FOREIGN PATENT DOCUMENTS

| | | |
|---|---|---|
| JP | 7-152202 | 6/1995 |
| JP | 3786034 | 3/2006 |
| JP | 3786035 | 3/2006 |
| JP | 2006-293320 | 10/2006 |
| JP | 2010-2800 | 1/2010 |
| JP | 2010-8447 | 1/2010 |

* cited by examiner

METHOD FOR PRODUCING TONER FOR DEVELOPING ELECTROSTATIC IMAGE AND APPARATUS FOR PRODUCING RESIN PARTICLES

BACKGROUND OF THE INVENTION

1. Field of the Invention

The present invention relates to a method for producing a toner for developing an electrostatic image in electrophotography, electrostatic recording, electrostatic printing, and the like, and a method and apparatus for producing resin particles.

2. Description of the Related Art

Conventionally, only pulverization methods had been used for producing a toner for developing an electrostatic image (hereinafter, also referred to as simply "toner") used for electrophotographic recording copiers, printers, facsimiles or hybrids thereof. However, recently, a so-called polymerization method in which a toner is formed in an aqueous medium is widely used, and has come to be more commonly used than the pulverization method. The toner produced by the polymerization method is a so-called "polymerized toner" or "chemical toner".

This is because toner materials are subjected to polymerization reaction when toner particles are formed or during the process of forming the toner particles. Examples of such polymerization methods in practical use include a suspension polymerization method, an emulsion polymerization method, a polymer suspension (polymer aggregation) method, and ester elongation method.

The toner obtained by the polymerization method has such properties that a small particle diameter can be obtained with ease, a particle size distribution is narrow, and a shape is substantially spherical, compared to the toner obtained by the pulverization method. By using the toner obtained by polymerization method, there is an advantage that a high quality image can be obtained by the electrophotographic system. On the other hand, it also has a disadvantage of being inefficient because the polymerization process requires much time, and toner particles are solidified and separated from the solvent, and then repeatedly washed and dried. The process requires a great deal of time, water, and energy.

There is a known method called the spray dry method in which a liquid formed by dissolving and dispersing a toner composition in an organic solvent (hereinafter also referred to as a toner composition liquid) is microparticulated using various atomizers, and then dried so as to obtain a powder toner (For example, Japanese Patent (JP-B) Nos. 3786034 and 3786035, JP-A No. 57-201248). According to this method, washing and drying can be eliminated because water is not necessarily used. Thus, the disadvantage of the polymerization method can be avoided.

According to the method for producing a toner disclosed in JP-B Nos. 3786034 and 3786035, and JP-A No. 57-201248, droplets ejected from nozzles each have a size corresponding to the nozzle diameter. In this method, the toner composition liquid is atomized so as to form droplets, and the droplets unfavorably aggregate before the formed droplets are dried, and then, the solvent is evaporated in the aggregated state, to thereby obtain a toner. As a result, it has been inevitable that the particle size distribution of the toner becomes broad due to aggregation of droplets, and the particle size distribution of the resulted toner has not been satisfactory.

The method for producing a toner by jet-atomizing disclosed in JP-A No. 2006-293320 has been proposed by the applicant of the present invention in aim of solving the above-described problems, and enables production of a toner having narrow particle size distribution with extremely high production efficiency and energy efficiency because it is not necessary to use a large amount of cleaning liquid and repeatedly separate solvent and particles.

However, the produced toner could have a broad particle size distribution depending on the production conditions. In this method, particularly when the large amount of the toner composition liquid is atomized, the droplets could form aggregates before the formed droplets are dried. This method is not sufficient to stably obtain a toner having a narrow particle size distribution.

When a toner having a broad particle size distribution is used in the electrophotographic system, a high-definition image cannot be obtained. Thus, the production of a toner having a narrow particle size distribution has been keenly demanded.

BRIEF SUMMARY OF THE INVENTION

The present invention is made to solve the above-described conventional problems, and aims to provide a method for producing a toner for developing an electrostatic image by jet atomizing, which can prevent droplets from being aggregated after jetted from nozzles, and therefore can obtain a toner having a narrow (sharp) particle size distribution and uniform charge amount distribution, thereby obtaining excellent image quality, and to provide a method and apparatus for producing resin particles.

The means for solving the aforementioned problems are as follows.

<1> A method for producing resin particles, including ejecting a liquid containing at least a resin in the form of droplets from a droplet ejecting unit having a plurality of holes provided in a part of a flow channel for feeding the liquid containing at least a resin, and drying and solidifying the ejected droplets so as to obtain the resin particles, while the ejected droplets are transported by a primary transport air flow flowing in the direction in which the droplets are ejected, wherein the ejected droplets are further transported by a secondary transport air flow which transports the ejected droplets in a different direction from a direction in which the primary transport air flow flows, and wherein a smaller angle of angles formed between a velocity vector of the primary transport air flow and a velocity vector of the secondary transport air flow is less than 120 degrees.

<2> The method for producing resin particles according to <1>, wherein the smaller angle of angles formed between the velocity vector of the primary transport air flow and the velocity vector of the secondary transport air flow is 45 degrees to 100 degrees.

<3> The method for producing resin particles according to any of <1> and <2>, wherein the smaller angle of angles formed between the velocity vector of the primary transport air flow and the velocity vector of the secondary transport air flow is 60 degrees to 90 degrees.

<4> The method for producing resin particles according to any of <1> to <3>, wherein the secondary transport air flow flows from upside to downside.

<5> The method for producing resin particles according to any of <1> to <4>, wherein a ratio V/H of a velocity V of the secondary transport air flow to a velocity H of the primary transport air flow is 0.5 to 3.0.

<6> A method for producing a toner for developing an electrostatic image, including ejecting a solution or dispersion liquid in the form of droplets from a droplet ejecting unit having a plurality of holes provided in a part of a flow channel for feeding the solution or dispersion liquid, the solution or dispersion liquid containing a solvent and a toner material containing at least a binder resin and a pigment, dissolved or dispersed in the solvent; and drying and solidifying the ejected droplets so as to obtain a toner, while the ejected droplets are transported by a primary transport air flow flowing in the direction in which the droplets are ejected, wherein the ejected droplets are further transported by a secondary transport air flow which transports the ejected droplets in a different direction from a direction in which the primary transport air flow flows, and wherein a smaller angle of angles formed between a velocity vector of the primary transport air flow and a velocity vector of the secondary transport air flow is less than 120 degrees.

<7> The method for producing a toner for developing an electrostatic image according to <6>, wherein the smaller angle of angles formed between the velocity vector of the primary transport air flow and the velocity vector of the secondary transport air flow is 45 degrees to 100 degrees.

<8> The method for producing a toner for developing an electrostatic image according to any of <6> and <7>, wherein the smaller angle of angles formed between the velocity vector of the primary transport air flow and the velocity vector of the secondary transport air flow is 60 degrees to 90 degrees.

<9> The method for producing a toner for developing an electrostatic image according to any of <6> to <8>, wherein the secondary transport air flow flows from upside to downside.

<10> The method for producing a toner for developing an electrostatic image according to any of <6> to <9>, wherein a ratio V/H of a velocity V of the secondary transport air flow to a velocity H of the primary air flow is 0.5 to 3.0.

<11> The method for producing a toner for developing an electrostatic image according to any of <6> to <10>, wherein the solvent is ethyl acetate.

<12> The method for producing a toner for developing an electrostatic image according to any of <6> to <11>, wherein the binder resin is a polyester resin.

<13> The method for producing a toner for developing an electrostatic image according to any of <6> to <12>, wherein the pigment is carbon black.

<14> The method for producing a toner for developing an electrostatic image according to any of <6> to <13>, wherein the toner material further comprises wax.

<15> The method for producing a toner for developing an electrostatic image according to <14>, wherein the wax is a carnauba wax.

<16> An apparatus for producing resin particles, including a droplet ejecting unit configured to eject a liquid containing at least a resin so as to form droplets, a primary transport air flow generating unit configured to generate a primary transport air flow transporting the droplets in a direction in which the droplets are ejected, and a secondary transport air flow generating unit configured to generate a secondary transport air flow transporting the droplets in a different direction from a direction in which the primary transport air flow flows, wherein the primary transport air flow generating unit and the secondary transport air flow generating unit are arranged so that a smaller angle of angles formed between a velocity vector of the primary transport air flow and a velocity vector of the secondary transport air flow is less than 120 degrees.

<17> The apparatus for producing resin particles according to <16>, wherein the droplet ejecting unit is arranged so as to horizontally eject the droplets.

<18> The apparatus for producing resin particles according to any of <16> and <17>, wherein a plurality of the droplet ejecting units and a plurality of the primary transport air flow generating units are arranged.

<19> The apparatus for producing resin particles according to any of <16> to <18>, wherein the secondary transport air flow generating unit is located upper side of the droplet ejecting unit, so that the secondary transport air flow flows from upside to downside.

According to the present invention, the following characteristic effect can be attained.

A method of the present invention for producing a toner for developing an electrostatic image can prevent droplets from being aggregated, and can produce a toner for developing an electrostatic image having a remarkably narrow particle size distribution, which cannot be attained by the conventional method.

Moreover, a method and apparatus of the present invention for producing resin particles can prevent droplets from being aggregated and can produce resin particles having a remarkably narrow particle size distribution.

DETAILED DESCRIPTION OF THE INVENTION

Hereinafter, the present invention will be described with reference to the embodiments based on the accompanying drawings. It should be appreciated that various changes and modifications are apparent to those skilled in the art and such changes and modifications are within the scope of the appended claims. The following description is intended to illustrate the best mode of the present invention by way of example only and should not be construed as a limitation to the scope of the appended claims.

Hereinafter, the present invention will be described in detail with reference to FIG. 1A.

Figure 1A:
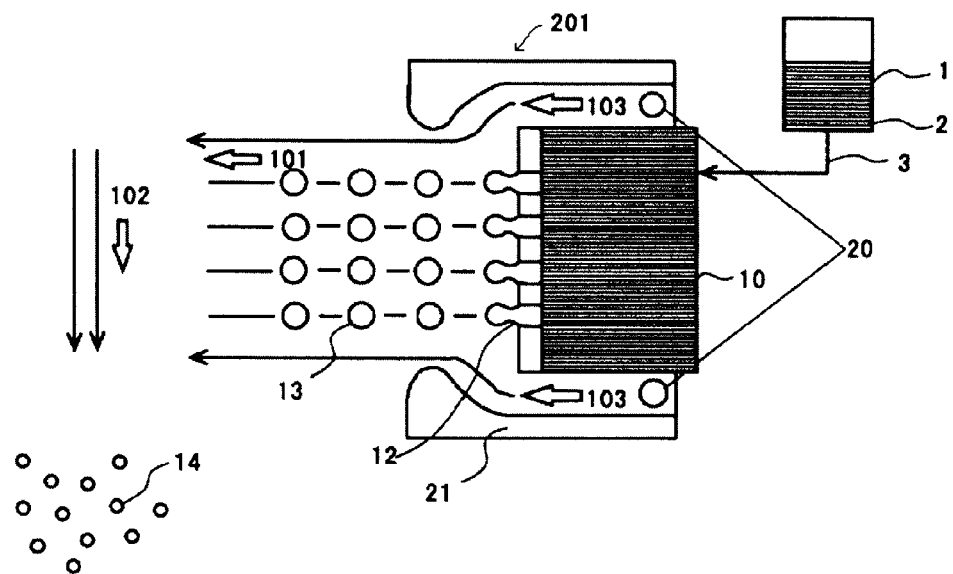
FIG. 1A is a schematic view showing a structure of a droplet ejecting member for carrying out a method for producing a toner as an example of a method for producing resin particles of the present invention.

FIG. 1A is a schematic view showing a structure of a droplet ejecting member for carrying out a method for producing a toner as an example of a method for producing resin particles (resin fine particles) of the present invention.

Figure 1B:
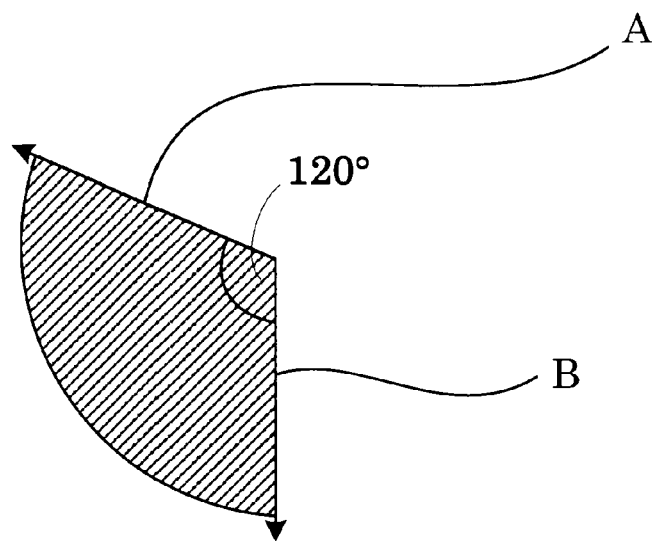
FIG. 1B is an explanatory view showing an example of an angle formed between a primary transport air flow and a secondary transport air flow.

A liquid container 2 contains a toner composition dispersion or solution 1 obtained by dissolving or dispersing, in a volatile solvent, a toner material containing at least a binder resin and a pigment (hereinafter, the toner composition dispersion or solution is referred to as simply a "toner composition liquid"). The toner composition liquid 1 is fed through a pipe 3 from the liquid container 2 to a droplet ejecting unit 10. The droplet ejecting unit 10 has holes 12 in a head 11. The droplets 13 are ejected from the holes 12. The droplets 13 are transported along a primary transport air flow 101 flowing in the same direction as the direction in which the droplets 13 are ejected, and then the droplets 13 are transported by the secondary transport air flow 102 flowing at an angle of less than 120 degrees with respect to the primary transport air flow 101. In other words, as shown in FIG. 1B, an angle of less than 120 degrees is formed between a velocity vector A of the primary transport air flow and a velocity vector B of the secondary transport air flow. As a result, the droplets 13 are entrained in the secondary transport air flow 102, and the direction of the droplets 13 is changed to the direction in which the secondary transport air flow 102 flows. As shown in FIG. 1A, the probability of forming aggregates of particles ejected from the same holes 12 is outstandingly decreased.

In FIG. 1A, in the droplet ejecting member 201, the secondary transport air flow 102 flows at an angle of approximately 90 degrees with respect to the primary transport air flow 101. However, the angle formed between the secondary transport air flow 102 and the primary transport air flow 101 is not limited to 90 degrees, but any angle may be formed as long as it is less than 120 degrees. The angle formed therebetween is preferably 45 degrees or more but less than 100 degrees, and more preferably 60 degrees to 90 degrees. When it is 120 degrees or more, the ejected droplets 13 return to the droplet ejecting member side via the secondary transport air flow 102, and the droplets 13 tend to adhere to the head 11, and then the adhered droplets clog the holes 12. Thus, the ejection of the droplets 13 may be stopped. When it is less than 45 degrees, the effect of decreasing the probability of forming aggregates, which is caused by forcibly changing the direction in which the droplets 13 are ejected, is obtained to a less extent.

The secondary transport air flow 102 flows faster than the free fall velocity of the droplets 13 (the final constant velocity (terminal velocity) of the droplets), and flows at a certain angle with respect to the direction in which the droplets 13 are ejected. The ratio (V/H) of a velocity V of the secondary transport air flow 102 to a velocity H of the primary transport air flow 101 including the ejected droplets is preferably set in the range from 0.5 to 3.0, in terms of preventing the droplets 13 from being aggregated. The ratio is more preferably set in the range from 0.75 to 2.0, and still more preferably from 1.0 to 1.5. When the ratio V/H is less than 0.5, the effect of the secondary transport air flow 102 on forcibly changing the ejection direction is small, and aggregation is less prevented. When the ratio V/H is more than 3.0, the track of horizontally ejected droplets 13 is excessively changed to the direction in which the secondary transport air flow flows, and thus the efficiency of prevention of aggregation is decreased.

Further, since the secondary transport air flow 102 used contains substantially no vapor of the solvent of the toner composition liquid 1, and the particle size of the droplets 13 is small, the ejected droplets 13 are remarkably rapidly dried. Even though the droplets that has been dried to some extent come into contact with each other in the dispersed state, the surfaces of the droplets have already been solidified and thus the droplets can be prevented from being aggregated. As a result, the ejected droplets 13 are dried while the probability of forming aggregates is being kept low, so as to form dried particles 14. The formed dried particles 14 are collected with a collecting device (not shown), and transported to a toner reservoir (not shown).

A gas is supplied from shroud air flow outlets 20 to a shroud so as to generate a shroud air flow 103, and a shroud cover 21 makes the direction of the primary transport air flow 101 to be the same as the direction in which the droplets are ejected. The flow rate of the shroud air flow 103 is adjusted so as to determine the flow velocity of the air flow at the point where the shroud air flow 103 passes through the head 11 of the droplet ejecting unit 10, namely to determine the velocity of the primary transport air flow 101. When the flow velocity near the head 11 is not uniform, the droplets 13 form aggregates. Thus, it is necessary to precisely supply gas toward the outlet of the shroud.

The shape of the shroud cover 21 is not particularly limited, and may be appropriately selected depending on the intended purpose, as long as the direction of the air flow is the same as the direction in which the droplets are ejected. As shown in FIG. 1A, the flow velocity may be controlled by narrowing the opening of the shroud cover 21 near the head 11 of the droplet ejecting unit 10.

The gas forming the primary transport air flow 101 is not particularly limited, and may be air or nonflammable gas such as nitrogen. A vapor of the same or similar material as the solvent used in the toner composition liquid 1 may be contained in the gas, in order to prevent the ejection of the droplets from being stopped, which is caused by the holes 12 clogged with the dried toner composition liquid 1 in or near the holes 12 provided in the droplet ejecting unit 10. The temperature of the primary transport air flow 101 can be appropriately adjusted, and it is preferred that the temperature does not vary during production. The velocity H of the primary transport air flow is preferably as great as, or greater than the ejection velocity of the droplets. But, it is not necessary that the velocity H of the primary transport air flow is far greater than the ejection velocity of the droplets. The velocity H of the primary transport air flow is preferably greater than the ejection velocity of the droplets by 1.0 time to 1.5 times.

The gas forming the secondary transport air flow 102 is not particularly limited, and may be air or nonflammable gas such as nitrogen. As described above, in order to prevent the droplets 13 from being aggregated, which is caused by drying, a gas which accelerates drying of the droplets is preferably used. Thus, it is preferred that the vapor of the solvent contained in the toner composition liquid is not included in the gas. The temperature of the secondary transport air flow 102 can be appropriately adjusted, and it is preferred that the temperature does not vary during production.

The particle size distribution of the toner collected by the above-described process is as shown in FIG. 2.

Figure 2:
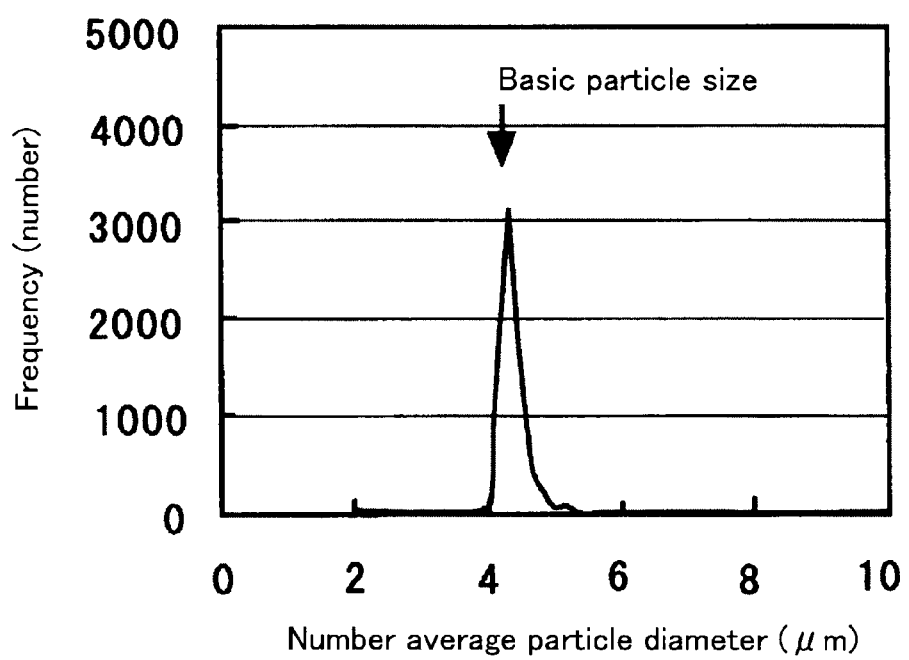
FIG. 2 is a graph showing a particle size distribution of toner particles produced by the method for producing a toner of the present invention.

FIG. 2 is a graph showing a particle size distribution of toner particles produced by the method of the present invention for producing a toner. This is a graph of an example of the collected toner. However, from the graph it is understood that almost all of the toner particles have the same particle diameter. This is the case where the toner particles are obtained by drying the ejected droplets 13 without forming aggregates.

On the other hand, the state where no transport air flow is generated will be described with reference to FIG. 3.

Figure 3:
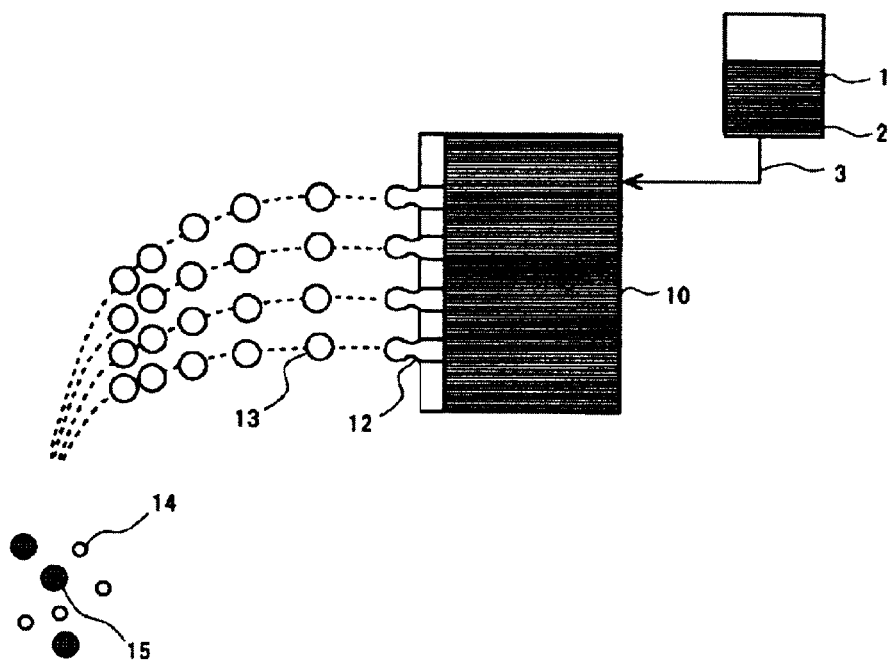
FIG. 3 is a view showing a conventional toner production apparatus, and a state where the droplets fall down in the case where no transport air flow is generated.

FIG. 3 is a view showing a conventional toner production apparatus, and a state where the droplets fall down in the case where no transport air flow is generated. The structure of the apparatus shown in FIG. 3 is the same as that shown in FIG. 1A, except that the primary transport air flow 101 and the secondary transport air flow 102 are not used in the apparatus shown in FIG. 3. The droplets 13 ejected from the droplet ejecting unit 10 receive air resistance, then rapidly slow down, and start to free fall. When the ejecting (falling) velocity is decreased, the distance between droplets becomes shorter, and in due course the droplets form aggregates. Moreover, the air resistance which the aggregated particles receive increases, and drying of the particles is delayed. Thus, the aggregated particles aggregate with other droplets, and several droplets may form one aggregate. The aggregates of droplets are dried to form dried particles 15. As a result, the obtained toner has a broad particle size distribution.

Figure 4:
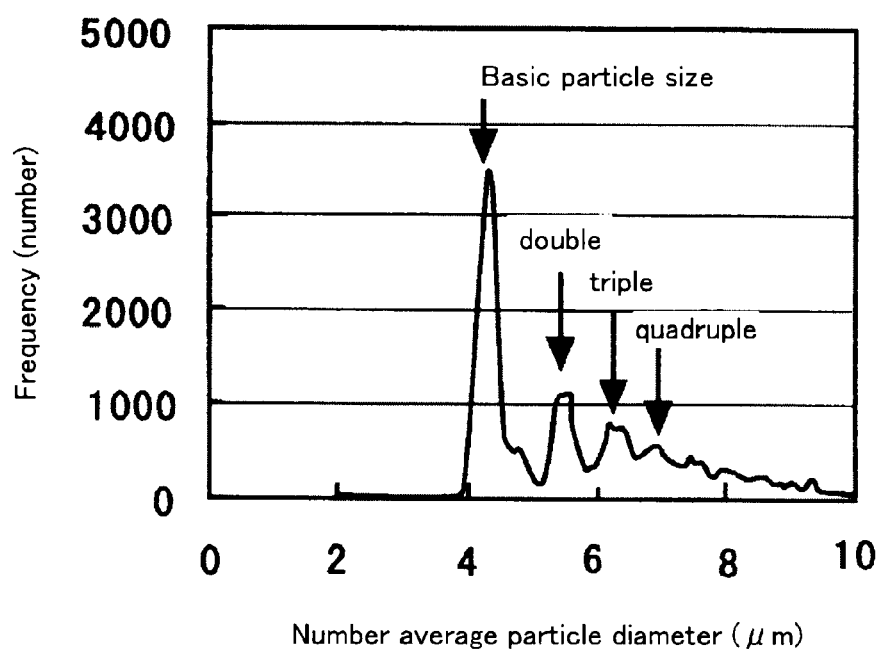
FIG. 4 is a graph showing a particle size distribution of toner particles produced by the conventional method for producing a toner.

The particle size distribution of the toner collected by the above-described process is as shown in FIG. 4.

FIG. 4 is a graph showing a particle size distribution of toner particles produced by the conventional method for producing a toner.

This is a graph of an example of the collected toner, wherein dried particles forming a peak indicated as a basic particle size shown in FIG. 4 are formed by drying and solidifying the droplets 13 without forming aggregates. The dried particles forming a peak indicated as double are formed by aggregating the droplets 13 after being ejected, and then drying and solidifying. Similarly, from the results of measurement of the particle size distribution, it can be estimated that triple, quadruple or more droplets, which are formed by aggregates of droplets, are formed.

Here, the particle size distribution of the toner can be measured using a flow particle image analyzer (FPIA-2000 manufactured by SYSMEX CORPORATION). The particle size distribution is expressed based on the ratio Dv/Dn of the volume average particle diameter (Dv) to the number average particle diameter (Dn). The minimum value of Dv/Dn is 1.0, which means that all particle sizes are the same. The larger the value of Dv/Dn is, the broader the particle size distribution is. The pulverized toner generally has a Dv/Dn of approximately 1.15 to approximately 1.25. The polymerized toner has a Dv/Dn of approximately 1.10 to approximately 1.15. When the toner of the present invention has a Dv/Dn of 1.15 or less, the effect on printing quality is confirmed. More preferably, the toner has a Dv/Dn of 1.10 or less.

In the electrophotographic system, the narrow particle size distribution is desired in steps of developing, transferring, and fixing. The broad particle size distribution is not desired. The toner preferably has a Dv/Dn of 1.15 or less, in order to stably obtain high-definition image quality. More preferably, the toner has a Dv/Dn of 1.10 or less, in order to obtain higher-definition image quality.

Figure 5:
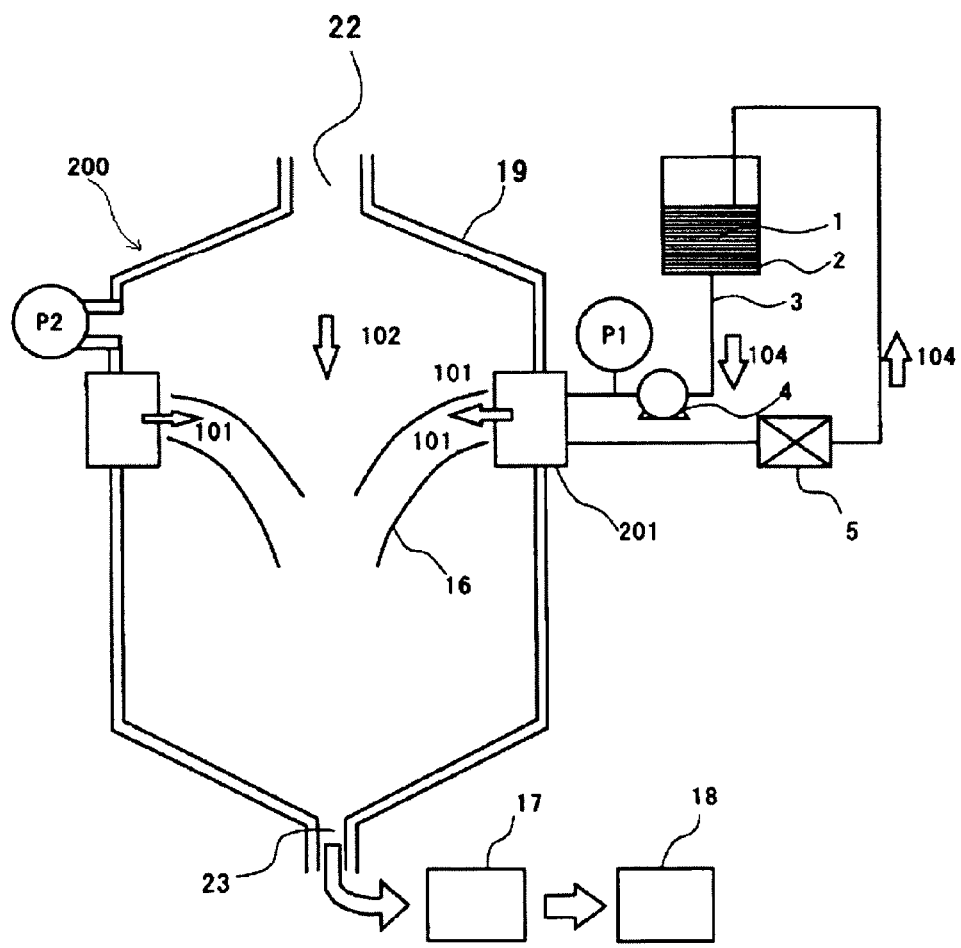
FIG. 5 is an explanatory view showing an embodiment of the method for producing a toner of the present invention.

FIG. 5 is an explanatory view showing an embodiment of the method for producing a toner of the present invention.

In this embodiment, a toner production apparatus 200 has the droplet ejecting member 201 (shown in FIG. 1A) embedded in the side wall of a chamber 19 serving as a space into which droplets are ejected during toner production. The detail of the droplet ejecting member 201 is as shown in FIG. 1A, and thus the detail of the droplet ejecting member 201 is not shown in FIG. 5. The droplet ejecting member 201 includes a droplet ejecting unit and a shroud for generating a primary transport air flow 101 (a primary transport air flow generating unit).

The chamber 19 has a structure that a secondary transport air flow 102 flows from upside to downside, namely, from an inlet 22 of the secondary transport air flow to a guide pipe 23 provided below. In the side wall of the chamber 19, a droplet ejecting member 201 is fixed at such an angle that the primary transport air flow 101 flows vertically with respect to the secondary transport air flow 102. A plurality of the ejecting members may be fixed in the chamber 19. FIG. 5 shows a structure in which two ejecting members are arranged. In FIG. 5, the secondary transport air flow flows from upside to downside. However, the flowing direction of the secondary transport air flow is not particularly limited and may be appropriately set as long as the secondary transport air flow flows at less than 120 degrees with respect to the flowing direction of the primary transport air flow. It is preferred that the secondary transport air flow flows from upside to downside because dried particles, which are formed by drying the droplets in the chamber, become hard to adhere to the chamber wall.

A secondary transport air flow generating unit (not shown) is not particularly limited, and can be appropriately selected depending on the intended purpose, as long as an air flow can be generated. For example, those similar to the primary transport air flow generating unit (such as a shroud) can be used.

With reference to FIG. 5, the detail of the embodiment of feeding a toner composition liquid 1 to the droplet ejecting member 201 will be described. The toner composition liquid 1 is contained in a liquid container 2 connected to the droplet ejecting member 201 through the pipe 3. As the driving force of feeding the toner composition liquid 1, a liquid feeding unit 4 may be used, or gravity may be utilized, or a liquid suction force by the droplet ejecting unit itself may be used. When the toner composition liquid 1 is fed to the droplet ejecting member 201, pulsation of liquid adversely affects ejection. As the liquid feeding unit 4, those causing no pulsation and utilizing gravity or the suction force of the ejecting member are preferably used. As the liquid feeding unit 4, various pumps can be used. For example, a gear pump is preferably used as the driving force causing no pulsation.

In FIG. 5, the toner composition liquid 1 fed to the droplet ejecting member 201 is circulated and returns to the liquid container 2. However, it is not necessary to circulate the toner composition liquid 1, and the toner composition liquid to be ejected from the droplet ejecting member 201 may be only fed to the droplet ejecting member 201. When the toner composition liquid 1 is circulate, the amount of the liquid can be controlled with a valve 5 provided in the pipe 3. The type of the valve is not particularly limited, and commonly used valves can be used. For the droplet ejecting member 201 shown at the right side of the chamber 19 in FIG. 5, the route of feeding the toner composition liquid 1 is illustrated. The same route is provided for the droplet ejecting member 201 shown at the left side of the chamber 19 in FIG. 5, but it is omitted therein.

The droplets (not shown) are ejected from the droplet ejecting member 201 to the direction of the primary transport air flow 101, and then the direction of the ejected droplets are forcibly changed by the secondary transport air flow 102, so as to follow a track 16. As a result, aggregation of the droplets can be prevented. Moreover, an organic solvent contained in the droplets vaporizes while the droplets are transported with the primary transport air flow 101 and the secondary transport air flow 102, aggregation of the droplets can be prevented. Consequently, dried particles having a narrow particle size distribution are formed during transportation of the droplets through the chamber 19. The dried particles 14 pass through the guide pipe 23 via the secondary transport air flow 102, and are collected in the toner collecting unit 17, and then contained in a toner reservoir 18. As the toner collecting unit 17, commonly used devices can be used. A cyclone collection device is preferably used.

The pressure of feeding the liquid to the droplet ejecting member, and the internal pressure of the chamber 19 are controlled with pressure gages P1 and P2. In the case of P1>P2, the toner composition liquid 1 may exude from the holes 12. In the case of P1<P2, gas may enter the droplet ejecting unit, and the ejection of the droplets is stopped. Thus, preferably, P1 is nearly equal to P2.

Figure 6A:
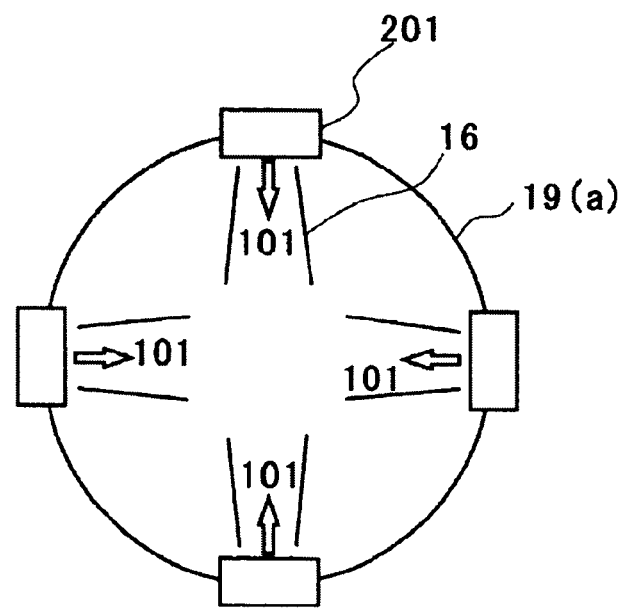
FIGS. 6A and 6B are explanatory views showing another embodiments of the method for producing a toner of the present invention.
Figure 6B:
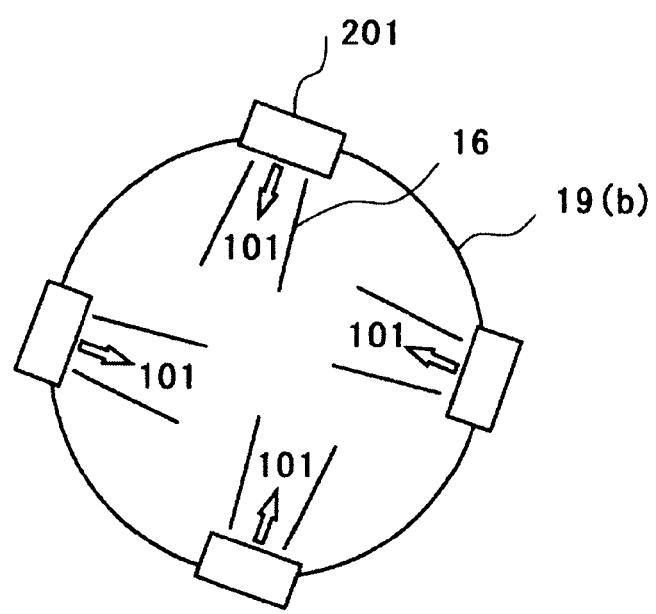

FIGS. 6A and 6B are explanatory views showing another embodiments of the method for producing a toner of the present invention.

FIGS. 6A and 6B are top views each showing the arrangement of the droplet ejecting members 201 fixed in the chamber 19. Here, a device for feeding the toner composition liquid is actually provided to the droplet ejecting member, but not shown in FIGS. 6A and 6B for simplifying the illustration. Here, four droplet ejecting units are arranged in the chamber. However, the number of the droplet ejecting members is not particularly limited, and it can be increased according to the intended amount of production. Moreover, a plurality of droplet ejecting units may be arranged in a longitudinal direction. In a chamber 19(a), four droplet ejecting members 201 are arranged, and all of them eject droplets toward the center of the chamber 19, and the ejected droplets follow tracks 16 toward the center of the chamber 19. While being ejected toward the center of the chamber 19, the droplets are transported downwardly by the secondary transport air flow (not shown).

Four droplet ejecting members 201 are arranged in the chamber 19 (b) at a certain angle off the center. Owing to such arrangement, it is not necessary to consider aggregation of droplets ejected from droplet ejecting members facing each other, and the space of the chamber can be effectively used. Thus, the structure of the chamber 19 (b) is preferably used when a plurality of the droplet ejecting members are arranged. The angle of the droplet ejecting member 201 with respect to the center can be adjusted as desired.

(Drying)

A secondary drying such as fluidized bed drying or vacuum drying may be performed, as necessary. The organic solvent remaining in toner not only changes toner properties, such as heat-resistant storage properties, fixing properties, and charging properties, varies over time, but also vaporizes at the time of fixing by heat. Consequently, there is high possibility that users or peripheral devices are adversely affected. Therefore, drying is sufficiently performed.

(Droplet Ejecting Unit)

The droplet ejecting unit used in the present invention is not particularly limited and known units can be used, as long as the particle size distribution of the droplet ejected from the droplet ejecting unit is narrow. A droplet ejecting unit configured to vibrate a thin film, in which a plurality of ejection holes are formed, is preferably used. As the film vibration-type droplet ejecting unit, indirect vibration-type droplet ejecting unit and direct vibration-type droplet ejecting unit will be described hereinafter.

(Indirect Vibration-Type Droplet Ejecting Unit)

Figure 7:
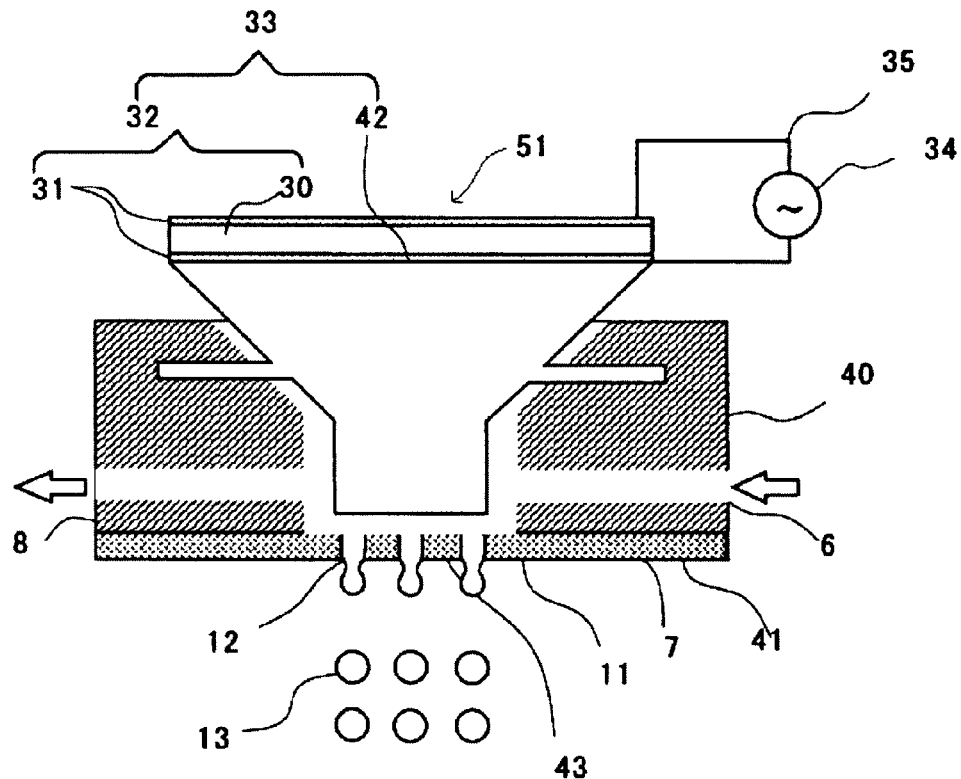
FIG. 7 is a schematic view showing an example of a structure of a film vibration-type (indirect vibration-type) droplet ejecting unit for carrying out the method for producing a toner of the present invention.
Figure 8:
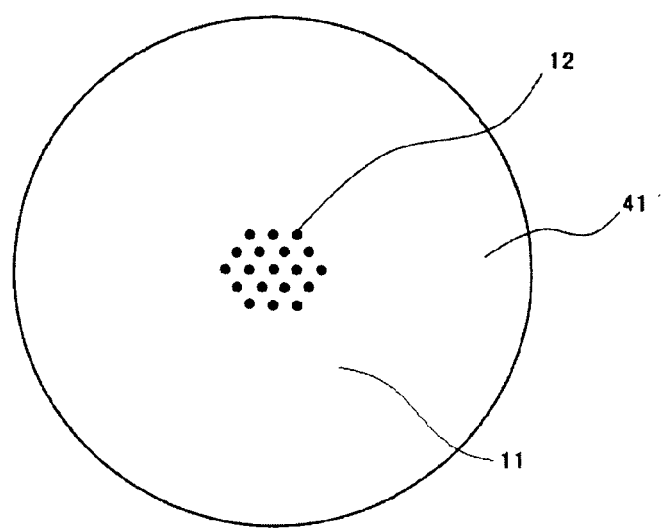
FIG. 8 is a schematic view of the film vibration-type (indirect vibration-type) droplet ejecting unit of FIG. 7 viewed from the bottom.

FIG. 7 is a schematic view showing a film vibration-type (indirect vibration-type) droplet ejecting unit for carrying out the method for producing a toner of the present invention, and a schematic cross-sectional view of an indirect vibration-type droplet ejecting unit 51. FIG. 8 is a schematic view of the film vibration-type (indirect vibration-type) droplet ejecting unit of FIG. 7 viewed from the bottom, and shows a bottom surface of the indirect vibration-type droplet ejecting unit 51. This indirect vibration-type droplet ejecting unit 51 includes a thin film 41 having a plurality of holes 12, a mechanically vibrating unit (hereinafter may be referred to as a "vibrating unit") 33 for vibrating the thin film 41, and a flow channel 7 forming a frame 40 from which the toner composition liquid 1 is fed to a space between the thin film 41 and a vibrating unit 33. The toner composition liquid 1 is fed from a feed opening 6 of the toner composition liquid, passes through the flow channel 7, and discharged from an outlet 8 of the toner composition liquid.

The thin film 41 having a plurality of holes 12 is placed in parallel with a vibrating surface 43 of the vibrating unit 33, and part of the thin film 41 is joined and fixed on the frame 40. In this state, the thin film 41 is positioned substantially perpendicular to a vibration direction of the vibrating unit 33. A circuit 35 is provided such that a voltage signal is applied to the top and under surfaces of a vibration generating unit 32 in the vibrating unit 33, and can convert signals received from a drive signal generation source 34 into a mechanical vibration. As the circuit 35 for giving electric signals, a lead wire whose surface has subjected to insulating coating is suitable. For the vibrating unit 33, it is advantageous, in order to efficiently and stably produce a toner, to use a device exhibiting a large vibration amplitude such as various types of horn-type vibrator and bolting Langevin transducer.

The vibrating unit 33 is composed of the vibration generating unit 32 configured to generate a vibration, and a vibration amplifying unit 42 configured to amplify the vibration generated by the vibration generating unit 32. In this vibrating unit 33, when a drive voltage having a required frequency (drive signal) is applied to between electrodes 31 of the vibration generating unit 32 from the drive signal generation source 34, a vibration is excited in the vibration generating unit 32 and then the vibration is amplified by the vibration amplifying unit 42. In this state, the vibrating surface 43 placed in parallel with the thin film 41 is periodically vibrated, and the thin film 41 is vibrated at a required frequency by periodically applied pressure brought by the vibration of the vibrating surface 43.

The vibrating unit 33 is not particularly limited, as long as it can assuredly vertically vibrate the thin film 41 at a constant frequency, and can be appropriately selected depending on the intended purpose. As the vibration generating unit 32, there is a need to vibrate the thin film 41, and therefore a bimorph-type piezoelectric element 30 is preferable. The bimorph-type piezoelectric element 30 can excite flexural oscillation and convert electric energy into mechanical energy. Specifically, it can excite flexural oscillation through application of a voltage to vibrate the thin film 41.

Figure 9:
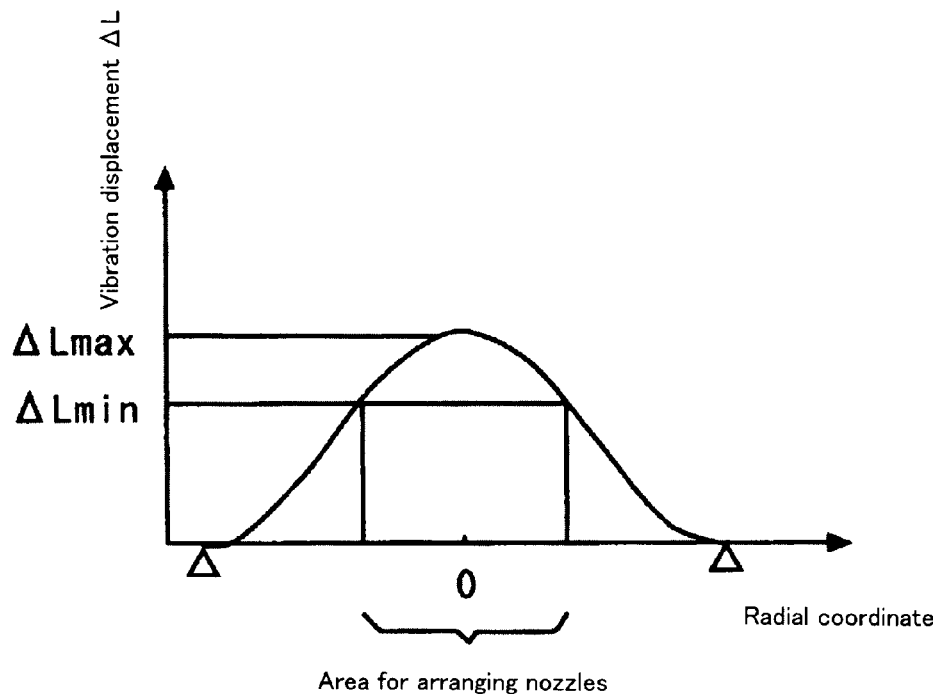
FIG. 9 is a graph showing a principle of ejecting droplets of a film vibration-type (direct vibration-type) droplet ejecting unit for carrying out the method for producing a toner of the present invention.

FIG. 9 is a graph showing a principle of ejecting droplets of a film vibration-type (direct vibration-type) droplet ejecting unit for carrying out the method for producing a toner of the present invention.

The deflection vibration of the thin film follows the curve (i.e., the cross-section of the thin film) in which displacement ΔL becomes the maximum displacement ΔLmax at a center portion of the thin film as shown in FIG. 9, and the thin film periodically vibrates in a vertical direction. The film periodically vibrating up and down, so that the droplets 13 are periodically ejected from the holes 12. The vibration displacement of the thin film 41 which can eject the droplets 13 is represented by the graph shown in FIG. 9, and the range of area in which the droplets can be ejected is limited. Thus, the holes 12 are preferably formed in this range of area. As shown in FIG. 8, holes 12 are arranged in the center portion of the thin film 41.

Examples of the piezoelectric element 30 serving as the vibration generating unit 32 include piezoelectric ceramics such as lead zirconium titanate (PZT). PZT is often used in a laminated state because it generally produces a small amount of deflection. Additionally, examples of the piezoelectric elements include piezoelectric polymers such as polyvinylidene fluoride (PVDF); crystals; and single crystals such as $LiNbO_3$, $LiTaO_3$ and $KNbO_3$.

The vibrating unit 33 may be set in any position, so long as it can vertically vibrate the thin film 41 having holes 12. The vibrating surface 43 is placed in parallel with the thin film 41.

In the illustrated example, a horn vibrator is used as the vibrating unit 33 composed of the vibration generating unit 32 and the vibration amplifying unit 42. This horn vibrator can amplify the amplitude of a vibration generated from the vibration generating unit 32 (e.g., a piezoelectric element) using the vibration amplifying unit 42 and thus, a mechanical vibration generated by the vibration generating unit 32 is allowed to be relatively small. Therefore, the mechanical load can be reduced, resulting in extending the service life of the production apparatus. The horn vibrator is not particularly limited and may be those having a generally known shape. The shape can be appropriately selected depending on the intended purpose. Further, as the vibrating unit 32, it is also possible to use a bolting Langevin transducer having very high mechanical strength. Even when a high-amplitude vibration is excited, the bolting Langevin transducer will not be broken since a piezoelectric ceramics is mechanically connected thereto.

In general, the size of the vibrating unit 33 which generates a mechanical vibration increases in accordance with decreasing of the number of vibrations generated. In consideration of the frequency required, the vibrating unit may be directly perforated to form a reservoir. In this case, it is possible to vibrate the entire reservoir with efficiency.

(Direct Vibration-Type Droplet Ejecting Unit)

Figure 10:
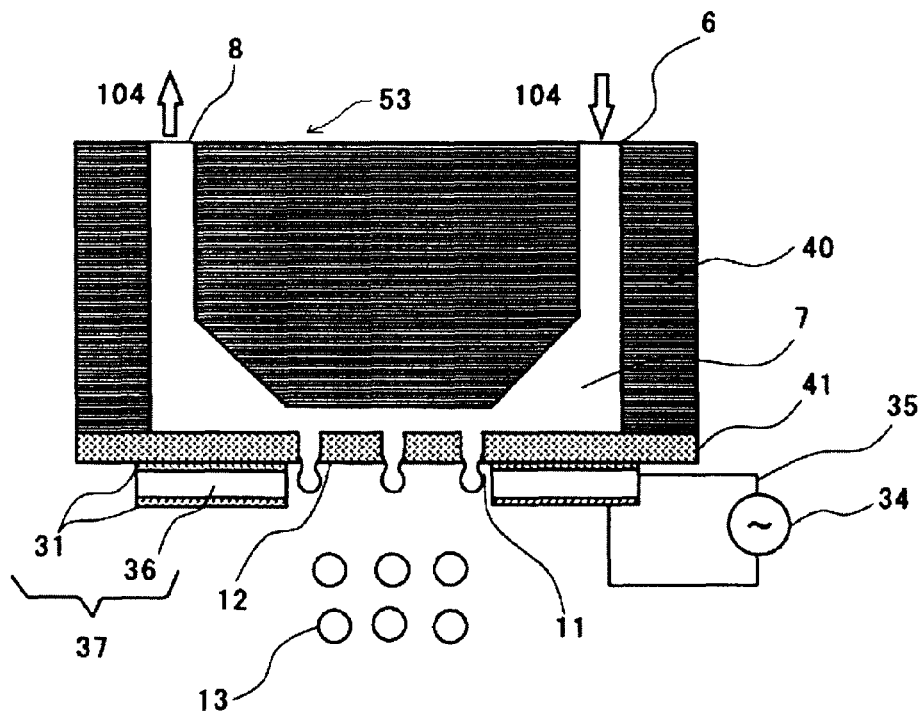
FIG. 10 is a schematic view showing an example of a structure of a film vibration-type (direct vibration-type) droplet ejecting unit for carrying out the method for producing a toner of the present invention.
Figure 11:
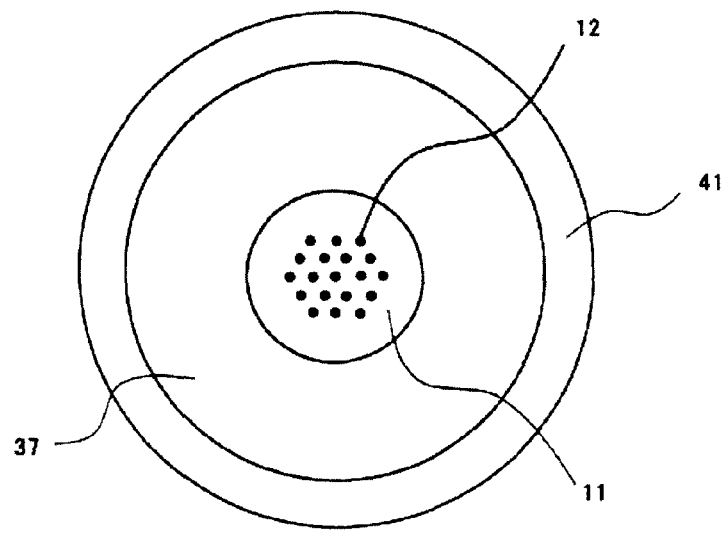
FIG. 11 is a schematic view of the film vibration-type (direct vibration-type) droplet ejecting unit of FIG. 10 viewed from the bottom.

FIG. 10 is a schematic view showing an example of a structure of a film vibration-type (direct vibration-type) droplet ejecting unit for carrying out the method for producing a toner of the present invention, and a schematic cross-sectional view of a direct vibration-type droplet ejecting unit 53. FIG. 11 is a schematic view of the film vibration-type (direct vibration-type) droplet ejecting unit of FIG. 10 viewed from the bottom, and shows a bottom surface of the direct vibration-type droplet ejecting unit 53.

The direct vibration-type droplet ejecting unit 53 includes at least a thin film 41 having holes 12 for ejecting droplets 13, an annular vibration generating unit 37 configured to vibrate the thin film 41, and a frame 40 in which a flow channel 7 for feeding the toner composition liquid 1 is provided. The toner composition liquid 1 is fed from a feed opening 6 of the toner composition liquid, passes through the flow channel 7, and discharged from an outlet 8 of the toner composition liquid.

The outer periphery of the thin film 41 is joined and fixed to the frame 40. The annular vibration generating unit 37 is provided in a surrounding area of the holes 12 of the thin film 41. The annular vibration generating unit 37 is constituted with an annular piezoelectric element 36 and an electrode 31, and a drive voltage (drive signal) having a certain frequency is applied to the electrode 31 via the circuit 35 from a drive signal generating source 34 so as to generate deflection vibration. The types of the annular piezoelectric element 36 and the electrode 31 used in the indirect vibration-type droplet ejecting unit 51 may be the same as used in the direct vibration-type droplet ejecting unit 53.

Similar to the indirect vibration-type ejecting unit 51, the deflection vibration of the thin film follows the curve (i.e., the cross-section of the thin film) in which displacement ΔL becomes the maximum displacement ΔLmax at a center portion of the thin film as shown in FIG. 9, and the thin film periodically vibrates in a vertical direction. The film periodically vibrating up and down, so that the droplets 13 are periodically ejected from the holes 12. The vibration displacement of the thin film 41 which can eject the droplets 13 is represented by the graph shown in FIG. 9, and the range of area in which the droplets can be ejected is limited. Thus, the holes 12 are preferably formed in this range of area. As shown in FIG. 11, holes 12 are arranged in the center portion of the thin film 41 and the annular vibration generating unit 37.

(Mechanism of Droplet Formation)

Next will be described a mechanism of droplet formation by the indirect vibration-type droplet ejecting unit 51 and the direct vibration-type droplet ejecting unit 53.

As described above, each of the droplet ejecting unit applies a vibration generated by the vibrating unit serving as a mechanically vibrating unit to the thin film 41 having a plurality of holes 12 facing the flow channel 7 to periodically vibrate the thin film 41, whereby droplets are stably formed and discharged from a plurality of holes 12 disposed in a relatively large area.

When the circular thin film is vibrated, a sound pressure of Pac is applied to the liquid present in the vicinity of the nozzles formed in the circular thin film. This Pac is proportional to a vibration speed Vm of the circular thin film. This sound pressure is known to arise as a result of reaction of a radiation impedance Zr of the medium (toner composition liquid), and is expressed by multiplying the radiation impedance by the film vibration speed Vm, as shown in the following Equation (1).

$$P_{ac}(r,t) = Z_r \cdot V_m(r,t) \qquad \text{Equation (1)}$$

The film vibration speed Vm periodically varies with time (i.e., is a function of time) and may form various periodic variations (e.g., a sine waveform and rectangular waveform). Also, as described above, the vibration displacement in a vibration direction varies depending on a position in the thin film (i.e., the vibration speed Vm is also a function of a position). As mentioned above, the vibration form of the thin film used in the present invention is axisymmetric. Thus, the vibration form is substantially a function of a radial coordinate.

The toner composition liquid is discharged to a gaseous phase by the action of the sound pressure periodically changing proportional to the position-dependent film vibration speed.

Then, the toner composition liquid, which has been periodically discharged to the gaseous phase, becomes spherical attributed to the difference in surface tension between in the liquid phase and in the gaseous phase, whereby droplets thereof are periodically discharged.

In order to form droplets, the thin film may be vibrated at a vibration frequency of 20 kHz to 2.0 MHz, preferably 50 kHz to 500 kHz. When the vibration frequency is 20 kHz or higher, dispersibility of fine particles (e.g., pigment and/or wax particles) contained in the toner composition liquid is promoted through excitation of the toner composition liquid.

Also, when the sound pressure is 10 kPa or higher, dispersibility of the above fine particles is further promoted.

(Thin Film Having a Plurality of Nozzles)

As described above, the thin film 41 having a plurality of holes 12 is a member for ejecting, in the form of droplet, a solution or dispersion liquid of toner composition.

The material of the thin film 41 and the shape of the holes 12 are not particularly limited and can be appropriately selected. Preferably, the thin film 41 is formed of a metal plate having a thickness of 5 µm to 500 µm and the holes 12 each have a pore size of 3 µm to 30 µm, from the viewpoint of forming liquid microdroplets having a outstandingly uniform particle diameter when droplets of the toner composition liquid 1 are jetted from the holes 12. Note that when the holes 12 each have a truly circular shape, the pore size is the diameter thereof. Meanwhile, when the holes 12 each have an ellipsoidal shape, the pore size is the minor axis thereof. The number of holes 12 is preferably 2 to 3,000.

Next, as an example of resin particles produced by the method for producing thereof according to the present invention, a toner will be described.

The toner produced by the method for producing a toner according to the present invention is a toner produced by the method for producing a toner using the apparatus of the present invention as the above-described toner production apparatus of the present embodiment, and thus the toner has a monodisperse particle size distribution.

Specifically, the particle size distribution (volume average particle diameter (Dv)/number average particle diameter (Dn)) of the toner is preferably in a rage from 1.00 to 1.15, and more preferably in a rage from 1.00 to 1.05. The volume average particle diameter is preferably in a rage from 1 µm to 20 µm, and more preferably 3 µm to 10 µm.

Next, a toner material used in the present invention will be described.

Firstly, as described above, the toner composition liquid formed by dissolving and dispersing the toner composition in a solvent will be described.

As the toner material, the material of the conventional electrophotographic toner can be used. Namely, a toner binder, such as a styrene acrylic resin, polyester resin, polyol resin, epoxy resin, is dissolved in an organic solvent selected from various organic solvents, and then a colorant is dispersed, and a release agent is further dispersed or dissolved, and then the resultant mixture is formed into liquid microdroplets by the method for producing a toner, and dried and solidified, to thereby produce desired toner particles.

(Toner Materials)

The toner materials contains at least a resin, a colorant and a wax; and, if necessary, contains a charge controlling agent, and additives, and other components.

(Resin)

As the resin, at least a binder resin is exemplified.

The resin is not particularly limited and can be appropriately selected from commonly used resins. Examples thereof include vinyl polymers formed of styrene monomers, acrylic monomers and methacrylic monomers; homopolymers or copolymers of these monomers; polyester resins; polyol resins; phenol resins; silicone resins; polyurethane resins; polyamide resins; furan resins; epoxy resins; xylene resins; terpene resins; coumarone-indene resins; polycarbonate resins; and petroleum resins.

Examples of the styrene monomers include styrene, o-methylstyrene, m-methylstyrene, p-methylstyrene, p-phenylstyrene, p-ethylstyrene, 2,4-dimethylstyrene, p-n-amylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene and p-nitrostyrene, and derivatives thereof.

Examples of the acrylic monomers include acrylic acid, methyl acrylate, ethyl acrylate, propyl acrylate, n-butyl acrylate, isobutyl acrylate, n-octyl acrylate, n-dodecyl acrylate, 2-ethylhexyl acrylate, stearyl acrylate, 2-chloroethyl acrylate and phenyl acrylate, and esters thereof.

Examples of the methacrylic monomer include methacrylic acid, methyl methacrylate, ethyl methacrylate, propyl methacrylate, n-butyl methacrylate, isobutyl methacrylate, n-octyl methacrylate, n-dodecyl methacrylate, 2-ethylhexyl methacrylate, stearyl methacrylate, phenyl methacrylate, dimethylaminoethyl methacrylate and diethylaminoethyl methacrylate, and esters thereof.

Examples of other monomers forming the vinyl polymers or copolymers include those listed in (1) to (18) given below:
(1) monoolefins such as ethylene, propylene, butylene and isobutylene; (2) polyenes such as butadiene and isoprene; (3) halogenated vinyls such as vinyl chloride, vinylidene chloride, vinyl bromide and vinyl fluoride; (4) vinyl esters such as vinyl acetate, vinyl propionate and vinyl benzoate; (5) vinyl ethers such as vinyl methyl ether, vinyl ethyl ether and vinyl isobutyl ether; (6) vinyl ketones such as vinyl methyl ketone, vinyl hexyl ketone and methyl isopropenyl ketone; (7) N-vinyl compounds such as N-vinylpyrrole, N-vinylcarbazole, N-vinylindole and N-vinylpyrrolidone; (8) vinylnaphthalenes; (9) acrylic or methacrylic acid derivatives such as acrylonitrile, methacrylonitrile and acrylamide; (10) unsaturated dibasic acids such as maleic acid, citraconic acid, itaconic acid, alkenylsuccinic acid, fumaric acid and mesaconic acid; (11) unsaturated dibasic acid anhydride such as maleic anhydride, citraconic anhydride, itaconic anhydride and alkenylsuccinic anhydride; (12) unsaturated dibasic acid monoesters such as monomethyl maleate, monoethyl maleate, monobutyl maleate, monomethyl citraconate, monoethyl citraconate, monobutyl citraconate, monomethyl itaconate, monomethyl alkenylsuccinate, monomethyl fumarate and monomethyl mesaconate; (13) unsaturated dibasic acid esters such as dimethyl maleate and dimethyl fumarate; (14) α,β-unsaturated carboxylic acids such as crotonic acid and cinnamic acid; (15) α,β-unsaturated carboxylic anhydride such as crotonic anhydride and cinnamic anhydride; (16) carboxyl group-containing monomers such as acid anhydrides formed between α,β-unsaturated carboxylic acids and lower fatty acids; and acid anhydrides and monoesters of alkenylmalonic acid, alkenylglutaric acid and alkenyladipic acid; (17) hydroxyalkyl(meth)acrylates such as 2-hydroxyethyl acrylate, 2-hydroxyethyl methacrylate and 2-hydroxypropyl methacrylate; and (18) hydroxyl group-containing monomers such as 4-(1-hydroxy-1-methylbutyl)styrene and 4-(1-hydroxy-1-methylhexyl)styrene.

In the toner produced by the method for producing a toner according to the present invention, the vinyl polymer or copolymer of the binder resin of the toner of the present invention may have a crosslinked structure formed by a crosslinking agent containing two or more vinyl groups. Examples of the crosslinking agent include aromatic divinyl compounds (e.g., divinyl benzene and divinyl naphthalene); di(meth)acrylate compounds having an alkyl chain as a linking moiety (e.g., ethylene glycol di(meth)acrylate, 1,3-butylene glycol di(meth)acrylate, 1,4-butanediol di(meth)acrylate, 1,5-pentanediol di(meth)acrylate, 1,6-hexanediol di(meth)acrylate and neopentyl glycol di(meth)acrylate); di(meth)acrylate compounds having, as a linking moiety, an alkyl chain containing an ether bond (e.g., diethylene glycol di(meth)acrylate, triethylene glycol di(meth)acrylate, tetraethylene glycol di(meth)acrylate, polyethylene glycol #400 di(meth)acrylate, polyethylene glycol #600 di(meth)acrylate and dipropylene glycol di(meth)acrylate; di(meth)acrylate compounds having a linking moiety containing an aromatic group or ether bond; and polyester diacrylates (e.g., MANDA (trade name) (product of NIPPON KAYAKU CO., LTD.)).

Examples of multifunctional crosslinking agents which can be used in addition to the above crosslinking agent include pentaerythritol tri(meth)acrylate, trimethylolethane tri(meth)acrylate, trimethylolpropane tri(meth)acrylate, tetramethylolmethane tetra(meth)acrylate, oligoester (meth) acrylate, triallyl cyanurate and triallyl trimellitate.

The amount of the crosslinking agent used is preferably 0.01 parts by mass to 10 parts by mass, more preferably 0.03 parts by mass to 5 parts by mass, relative to 100 parts by mass of the other monomer component. Among the above crosslinkable monomers, preferred are aromatic divinyl compounds (in particular, divinyl benzene) and diacrylate compounds having a linking moiety containing one aromatic group or ether bond, since these can impart desired fixing property and offset resistance to the resin for toner. Also, copolymers formed between the above monomers are preferably styrene copolymers and styrene-acrylic copolymers.

Examples of polymerization initiators used for producing the vinyl polymer or copolymer include 2,2'-azobisisobutylonitrile, 2,2'-azobis (4-methoxy-2,4-dimethylvaleronitrile), 2,2'-azobis(2,4-dimethylvaleronitrile), 2,2'-azobis(2-methylbutylonitrile), dimethyl-2,2'-azobisisobutyrate, 1,1'-azobis (1-cyclohexanecarbonitrile), 2-(carbamoylazo)-isobutylonitrile, 2,2'-azobis(2,4,4-trimethylpentane), 2-phenylazo-2',4'-dimethyl-4'-methoxyvaleronitrile, 2,2'-azobis(2-methylpropane), ketone peroxides (e.g., methyl ethyl ketone peroxide, acetylacetone peroxide and cyclohexanone peroxide), 2,2-bis(tert-butylperoxy)butane, tert-butyl hydroperoxide, cumene hydroperoxide, 1,1,3,3-tetramethylbutyl hydroperoxide, di-tert-butylperoxide, tert-butyl cumylperoxide, dicumyl peroxide, α-(tert-butylperoxy)isopropylbenzene, isobutyl peroxide, octanoyl peroxide, decanoyl peroxide, lauroyl peroxide, 3,5,5-trimethylhexanoyl peroxide, benzoyl peroxide, m-tolyl peroxide, di-isopropyl peroxydicarbonate, di-2-ethylhexyl peroxydicarbonate, di-n-propyl peroxydicarbonate, di-2-ethoxyethyl peroxycarbonate, di-ethoxyisopropyl peroxydicarbonate, di(3-methyl-3-methoxybutyl)peroxycarbonate, acetylcyclohexylsulfonyl peroxide, tert-butyl peroxyacetate, tert-butylperoxyisobutylate, tert-butylperoxy-2-ethylhexalate, tert-butylperoxylaurate, tert-butyl-oxybenzoate, tert-butylperoxyisopropylcarbonate, di-tert-butylperoxyisophthalate, tert-butylperoxyallylcarbonate, isoamylperoxy-2-ethylhexanoate, di-tert-butylperoxyhexahydroterephthalate and tert-butylperoxyazelate.

When the binder resin is a styrene-acrylic resin, tetrahydrofuran (THF) soluble matter of the resin preferably has such a molecular weight distribution as measured by GPC that at least one peak exists in a range of M.W. 3,000 to M.W. 50,000 (as converted to a number average molecular weight) and at least one peak exists in a range of M.W. 100,000 or higher, since the formed toner has desired fixing property, offset resistance and storage stability. Preferably, THF soluble matter of the binder resin has a component with a molecular weight equal to or lower than M.W. 100,000 of 50% to 90%, more preferably has a main peak in a range of M.W. 5,000 to M.W. 30,000, most preferably M.W. 5,000 to M.W. 20,000.

When the binder resin is a vinyl polymer such as a styrene-acrylic resin, the acid value thereof is preferably 0.1 mgKOH/g to 100 mgKOH/g, more preferably 0.1 mgKOH/g to 70 mgKOH/g, still more preferably 0.1 mgKOH/g to 50 mgKOH/g.

Examples of the monomer forming the polyester polymer include dihydric alcohols such as ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A; and diol products formed between bisphenol A and a cyclic ether (e.g., ethylene oxide and propylene oxide).

Alcohols having three or more hydroxyl groups are preferably used for crosslinking reaction of the polyester resin.

Examples of the alcohols having three or more hydroxyl groups include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxybenzene.

Examples of the acid forming the polyester polymer include benzenedicarboxylic acids (e.g., phthalic acid, isophthalic acid and terephthalic acid) and anhydrides thereof, alkyldicarboxylic acids (e.g., succinic acid, adipic acid, sebacic acid and azelaic acid) and anhydrides thereof, unsaturated dibasic acids (e.g., maleic acid, citraconic acid, itaconic acid, alkenylsuccinic acid, fumaric acid and mesaconic acid; unsaturated dibasic acid anhydrides (e.g., maleic anhydride, citraconic anhydride, itaconic anhydride and alkenylsuccinic anhydride); carboxylic acids having three or more carboxyl groups (e.g., trimellitic acid, pyromellitic acid, 1,2,4-benzenetricarboxylic acid, 1,2,5-benzenetricarboxylic acid, 2,5,7-naphthalenetricarboxylic acid, 1,2,4-naphthalenetricarboxylic acid, 1,2,4-butanetricarboxylic acid, 1,2,5-haxanetricarboxylic acid, 1,3-dicarboxyl-2-methyl-2-methylenecarboxypropane, tetra(methylenecarboxylic) methane, 1,2,7,8-octanetetracarboxylic acid and ENPOL trimer acid); anhydrides of these carboxylic acids having three or more carboxyl groups; and partial alkyl esters of these carboxylic acids having three or more carboxyl groups.

When the binder resin is a polyester resin, THF soluble matter of the resin preferably has such a molecular weight distribution that at least one peak exists in a range of M.W. 3,000 to M.W. 50,000, since the formed toner has desired fixing property and offset resistance. Preferably, THF soluble matter of the binder resin has a component with a molecular weight equal to or lower than M.W. 100,000 of 60% to 100%, more preferably has at least one peak in a range of M.W. 5,000 to M.W. 20,000.

Also, the acid value of the polyester resin is preferably 0.1 mgKOH/g to 100 mgKOH/g, more preferably 0.1 mgKOH/g to 70 mgKOH/g, still more preferably 0.1 mgKOH/g to 50 mgKOH/g.

The molecular weight distribution of the binder resin is determined through gel permeation chromatography (GPC) using THF as a solvent.

As a binder resin which can be used in the toner of the present invention, resins having a monomer component capable of reacting therewith may be incorporated into at least one of the vinyl polymer and the polyester resin. Examples of monomers which form polyester resins and are capable of reacting with a vinyl polymer include unsaturated dicarboxylic acids (e.g., phthalic acid, maleic acid, citraconic acid and itaconic acid) and anhydrides thereof. Examples of monomers forming the vinyl polymer include those having a carboxyl group or hydroxyl group; and (meth)acrylates.

When the polyester polymer, the vinyl polymer and other binder resins are used in combination, 60% by mass or higher of the mixed binder resin preferably have an acid value of 0.1 mgKOH/g to 50 mgKOH/g.

The acid value of the binder resin of the toner composition is measured according to JIS K-0070 as follows:

(1) additives other than a binder resin (polymer component) are removed to prepare a sample, followed by pulverizing, and 0.5 g to 2.0 g of the thus-obtained sample is precisely weighed (W g); (note that when the acid value of the binder resin is measured using an untreated toner sample, a colorant, a magnetic material, etc. other than the binder resin and crosslinked binder resin are separately measured in advance for their content and acid value; and the acid value of the binder resin is calculated based on the thus-obtained value);

(2) the sample is placed in a 300-mL beaker and dissolved using a liquid mixture of toluene/ethanol (4/1 by volume) (150 mL);

(3) the resultant sample solution and a blank sample are titrated with a 0.1 mol/L solution of KOH in ethanol using a potentiometric titrator; and (4) using the amount (S mL) of the KOH solution consumed for the sample solution and the amount (B mL) of the KOH solution consumed for the blank sample, the acid value of the sample is calculated based on the following Equation:

$$\text{Acid value (mgKOH/g)} = [(S-B) \times f \times 5.61]/W \quad \text{Equation}$$

where f is a factor of KOH.

The binder resin of the toner or the composition containing the binder resin preferably have a glass transition temperature (Tg) of 35° C. to 80° C., more preferably 40° C. to 75° C., from the viewpoint of attaining desired storage stability of the formed toner. When the glass transition temperature (Tg) is lower than 35° C., the formed toner tends to degrade under high temperature conditions and to involve offset during fixing. When the Tg is higher than 80° C., the formed toner may have degraded fixing property.

Examples of the magnetic material used in the present invention include (1) magnetic iron oxides (e.g., magnetite, maghemite and ferrite), and iron oxides containing other metal oxides; (2) metals such as iron, cobalt and nickel, and alloys prepared between these metals and metals such as aluminum, cobalt, copper, lead, magnesium, tin, zinc, antimony, beryllium, bismuth, cadmium, calcium, manganese, selenium, titanium, tungsten and/or vanadium; and (3) mixtures thereof.

Specific examples of the magnetic material include $Fe_3O_4$, $\gamma\text{-}Fe_2O_3$, $ZnFe_2O_4$, $Y_3Fe_5O_{12}$, $CdFe_2O_4$, $Gd_3Fe_5O_{12}$, $CuFe_2O_4$, $PbFe_{12}O$, $NiFe_2O_4$, $NdFe_2O$, $BaFe_{12}O_{19}$, $MgFe_2O_4$, $MnFe_2O_4$, $LaFeO_3$, iron powder, cobalt powder, and nickel powder. These may be used alone or in combination. Of these, micropowders of ferrosoferric oxide or γ-iron sesquioxide are particularly preferred.

Further, magnetic iron oxides (e.g., magnetite, maghemite and ferrite) containing other elements or mixtures thereof can be used. Examples of the other elements include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc and gallium. Of these, magnesium, aluminum, silicon, phosphorus and zirconium are particularly preferred. The other element may be incorporated in the crystal lattice of an iron oxide, may be incorporated into an iron oxide in the form of oxide, or may be present on the surface of an iron oxide in the form of oxide or hydroxide. Preferably, it is contained in the form of oxide.

Incorporation of the other elements into the target particles can be performed as follows: salts of the other elements are allowed to coexist with the iron oxide during formation of a magnetic material, and then the pH of the reaction system is appropriately adjusted. Alternatively, after formation of magnetic particles, the pH of the reaction system may be adjusted with or without salts of the other elements, to thereby precipitate these elements on the surface of the particles.

The amount of the magnetic material used is preferably 10 parts by mass to 200 parts by mass, more preferably 20 parts by mass to 150 parts by mass relative to 100 parts by mass of the binder resins. The number average particle diameter of the magnetic material is preferably 0.1 μm to 2 μm, more preferably 0.1 μm to 0.5 μm. The number average particle diameter of the magnetic material can be measured by observing a magnified photograph thereof obtained through transmission electron microscopy using a digitizer or the like.

For magnetic properties of the magnetic material under application of 10 kOersted, it is preferably to use a magnetic material having an anti-magnetic force of 20 Oersted to 150 Oersted, a saturation magnetization of 50 emu/g to 200 emu/g, and a residual magnetization of 2 emu/g to 20 emu/g.

The magnetic material can also be used as a colorant.

(Colorant)

The colorant is not particularly limited and can be appropriately selected from commonly used resins depending on the intended purpose. Examples thereof include carbon black, nigrosine dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazinelake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS and BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian, emerald green, pigment green B, naphthol green B, green gold, acid green lake, malachite green lake, phthalocyanine green, anthraquinon green, titanium oxide, zinc flower, lithopone, and mixtures thereof.

The colorant content of the toner is preferably 1% by mass to 15% by mass, preferably 3% by mass to 10% by mass.

In the toner produced by the method for producing a toner according to the present invention, the colorant may be mixed with a resin to form a masterbatch. Examples of the binder resin which is to be kneaded together with a masterbatch include modified or unmodified polyester resins; styrene polymers and substituted products thereof (e.g., polystyrenes, poly-p-chlorostyrenes and polyvinyltoluenes); styrene copolymers (e.g., styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-methyl α-chloromethacrylate copolymers, styrene-acrylonitrile copolymers, styrene-vinyl methyl ketone copolymers, styrene-butadiene copolymers, styrene-isoprene copolymers, styrene-acrylonitrile-indene copolymers, styrene-maleic acid copolymers, styrene-maleic acid ester copolymers); polymethyl methacrylates; polybutyl methacrylates; polyvinyl chlorides; polyvinyl acetates; polyethylenes; polypropylenes, polyesters; epoxy resins; epoxy polyol resins; polyurethanes; polyamides; polyvinyl butyrals; polyacrylic acid resins; rosin; modified rosin; terpene resins; aliphatic or alicyclic hydrocarbon resins; aromatic petroleum resins; chlorinated paraffins; and paraffin waxes. These may be used alone or in combination.

The masterbatch can be prepared by mixing/kneading a colorant with a resin for use in a masterbatch through application of high shearing force. Also, an organic solvent may be used for improving mixing between these materials. Further, the flashing method, in which an aqueous paste containing a colorant is mixed/kneaded with a resin and an organic solvent and then the colorant is transferred to the resin to remove water and the organic solvent, is preferably used, since a wet cake of the colorant can be directly used (i.e., no drying is required to be performed). In this mixing/kneading, a high-shearing disperser (e.g., three-roll mill) is preferably used.

The amount of the masterbatch used is preferably 0.1 parts by mass to 20 parts by mass relative to 100 parts by mass of the binder resin.

The resin used for forming the masterbatch preferably has an acid value of 30 mgKOH/g or lower and amine value of 1 to 100, more preferably has an acid value of 20 mgKOH/g or lower and amine value of 10 to 50. In use, a colorant is preferably dispersed in the resin. When the acid value is higher than 30 mgKOH/g, chargeability degrades at high humidity and the pigment is insufficiently dispersed. Meanwhile, when the amine value is lower than 1 or higher than 100, the pigment may also be insufficiently dispersed. Notably, the acid value can be measured according to JIS K0070, and the amine value can be measured according to JIS K7237.

Also, a dispersant used preferably has higher compatibility with the binder resin from the viewpoint of attaining desired dispersibility of the pigment. Specific examples of commercially available products thereof include "AJISPER PB821," AJISPER PB822" (these products are of Ajinomoto Fin-Techno Co., Inc.), "Disperbyk-2001" (product of BYK-chemie Co.) and "EFKA-4010" (product of EFKA Co.).

The dispersant is preferably incorporated into the toner in an amount of 0.1% by mass to 10% by mass with respect to the colorant. When the amount is less than 0.1% by mass, the pigment is insufficiently dispersed. Whereas when the amount is more than 10% by mass, chargeability degrades at high humidity.

The dispersant preferably has a weight average molecular weight as measured through gel permeation chromatography of 500 to 100,000, more preferably 3,000 to 100,000, particularly preferably 5,000 to 50,000, most preferably 5,000 to 30,000, from the viewpoint of attaining desired dispersibility of the pigment, wherein the weight average molecular weight is a maximum molecular weight as converted to styrene on a main peak. When the weight average molecular weight is lower than 500, the dispersant has high polarity, potentially degrading dispersibility of the colorant. Whereas when the weight average molecular weight is higher than 100,000, the dispersant has high affinity to a solvent, potentially degrading dispersibility of the colorant.

The amount of the dispersant used is preferably 1 part by mass to 200 parts by mass, more preferably 5 parts by mass to 80 parts by mass, relative to 100 parts by mass of the colorant. When the amount is less than 1 part by mass, dispersibility may degrade; whereas when the amount is more than 200 parts by mass, chargeability may degrade.

(Wax)

The toner composition liquid used in the present invention contains a wax together with the binder resin and the colorant The wax used in the present invention is not particularly limited and may be suitably selected from commonly used waxes. Examples of the waxes include aliphatic hydrocarbon waxes such as low-molecular-weight polyethylene, low-molecular-weight polypropylene, polyolefin waxes, microcrystalline waxes, paraffin waxes and Sasol wax; oxides and block copolymers of aliphatic hydrocarbon waxes such as oxidized polyethylene waxes; vegetable waxes such as candelilla waxes, carnauba waxes, Japan waxes and jojoba waxes; animal waxes such as beeswaxes, lanolin and whale waxes; mineral waxes such as ozocerite, ceresin and petrolatum; waxes composed mainly of fatty acid esters, such as montanic acid ester waxes and castor waxes; and compounds each obtained by deoxidizing a part or whole of a fatty acid ester, such as deoxidized carnauba waxes.

Additional examples of the waxes include saturated straight-chain fatty acids such as palmitic acid, stearic acid, montanic acid, and straight-chain alkylcarboxylic acids having straight-chain alkyl groups; unsaturated fatty acids such as prandinic acid, eleostearic acid and valinaphosphoric acid; saturated alcohols such as stearyl alcohol, eicosyl alcohol, behenyl alcohol, carnaubyl alcohol, ceryl alcohol, mesilyl alcohol and long-chain alkyl alcohols; polyhydric alcohols such as sorbitol; fatty acid amides such as linoleic acid amide, olefinic acid amide and lauric acid amide; saturated fatty acid bisamides such as methylenebiscapric acid amide, ethylenebislauric acid amide and hexamethylenebisstearic acid amide; unsaturated fatty acid amides such as ethylenebisoleic acid amide, hexamethylenebisoleic acid amide, N,N'-dioleyladipic acid amide and N,N'-dioleylsebacic acid amide; aromatic bisamides such as m-xylenebisstearic acid amide and N,N-distearylisophthalic acid amide; fatty acid metal salts such as calcium stearate, calcium laurate, zinc stearate and magnesium stearate; waxes each obtained by grafting a wax which is based upon an aliphatic hydrocarbon, using a vinyl monomer such as styrene or acrylic acid; partial ester compounds each composed of a polyhydric alcohol and a fatty acid such as monoglyceride behenate; and hydroxyl group-containing methyl ester compounds each obtained by hydrogenating a vegetable oil or fat.

More suitable examples thereof include polyolefins produced by radically polymerizing olefins under high pressure; polyolefins each produced by refining a low-molecular-weight by-product obtained at the time of polymerization for a high-molecular-weight polyolefin; polyolefins produced by polymerization under low pressure, using a catalyst such as a Ziegler catalyst or a metallocene catalyst; polyolefins produced by polymerization, utilizing a radiant ray, an electromagnetic wave or light; low-molecular-weight polyolefins obtained by pyrolyzing high-molecular-weight polyolefins; paraffin waxes, microcrystalline waxes, Fischer-Tropsch waxes, synthetic hydrocarbon waxes synthesized in accordance with Synthol method, hydrocoal method or Arge method, synthetic waxes each containing as a monomer a compound which has one carbon atom, and hydrocarbon waxes each having a functional group such as hydroxyl group or carboxyl group; mixtures each composed of a hydrocarbon wax and a functional group-containing hydrocarbon wax; and waxes produced by graft-modifying these waxes with a vinyl monomer such as styrene, a maleic acid ester, an acrylate, a methacrylate or maleic anhydride.

Also, suitable examples thereof further include waxes obtained by subjecting these waxes to a press sweating method, a solvent method, a recrystallization method, a vacuum distillation method, a supercritical gas extraction method or a solution crystallization method to have sharp molecular weight distributions; and waxes obtained by removing low-molecular-weight solid fatty acids, low-molecular-weight solid alcohols, low-molecular-weight solid compounds or other impurities from these waxes.

It is desirable in view of balancing toner-fixing property and offset resistance that the melting point of the wax be 70° C. to 140° C., more preferably 70° C. to 120° C. When the melting point is lower than 70° C., there may be a decrease in blocking resistance. When the melting point is higher than 140° C., an offset-resistant effect may not be sufficiently exhibited.

Use of two or more different types of waxes together makes it possible to simultaneously exhibit a plasticizing effect and a releasing effect, which are effects of waxes. Examples of waxes having plasticizing effects include waxes having low melting points, specifically waxes each having a branched chain or a polar group in its molecular structure. Examples of waxes having releasing effects include waxes having high melting points, specifically waxes each having in its molecular structure a straight chain or having no functional group and thus no polarity. Examples of combinations of waxes for use include a combination of two or more different types of waxes that are different from one another by 10° C. to 100° C. in melting point, and a combination of a polyolefin and a graft-modified polyolefin.

As to the selection of two types of waxes, relatively speaking, when these waxes have similar compositions, a wax having a low melting point exhibits a plasticizing effect and a wax having a high melting point exhibits a releasing effect. On this occasion, when the difference in melting point is 10° C. to 100° C., functional separation can be effectively performed. When the difference in melting point is less than 10° C., an effect of functional separation may not be sufficiently exhibited. When the difference in melting point is greater than 100° C., functions derived from the interaction between the waxes may not be fully performed. On this occasion, one of the waxes preferably has a melting point of 70° C. to 120° C., more preferably 70° C. to 100° C., because an effect of functional separation tends to be easily exhibited.

As to the combination of waxes, relatively speaking, a wax which has a branched-chain structure or a polar group such as a functional group or is modified with a component different from its main component exhibits a plasticizing effect, and a wax which has a straight-chain structure or has no functional group and thus no polarity, or which has an unmodified straight structure exhibits a releasing effect. Suitable examples of the combination of waxes include a combination of a polyethylene homopolymer/copolymer composed mainly of ethylene, and a polyolefin homopolymer/copolymer composed mainly of an olefin other than ethylene; a combination of a polyolefin and a graft-modified polyolefin; a combination of an alcohol wax, a fatty acid wax or an ester wax, and a hydrocarbon wax; a combination of a Fischer-Tropsch wax or a polyolefin wax, and a paraffin wax or a microcrystalline wax; a combination of a Fischer-Tropsch wax and a polyolefin wax; a combination of a paraffin wax and a microcrystalline wax; and a combination of a carnauba wax, a candelilla wax, a rice wax or a montan wax, and a hydrocarbon wax.

In any case, it is desirable that the peak top temperature of the maximum peak lie in the temperature range of 70° C. to 110° C. and more desirable that the maximum peak lie in the temperature range of 70° C. to 110° C. regarding an endothermic peak observed in a DSC measurement of toner because it becomes easier to balance toner storage stability and toner-fixing property.

The total amount of the wax contained is preferably 0.2 parts by mass to 20 parts by mass, more preferably 0.5 parts by mass to 10 parts by mass, relative to 100 parts by mass of the binder resin.

In the present invention, the melting point of the wax is defined as the peak top temperature of the maximum peak in the endothermic peak of the wax measured in a DSC measurement.

As for the DSC measuring unit for the wax or the toner, a high-precision internal combustion input compensation type of differential scanning calorimeter is preferably used for the measurement. The endothermic peak measurement is performed in a manner compliant with ASTM D3418-82. As for the DSC curve used in the present invention, the temperature of the wax or the toner is raised once and lowered to record the temperature history, and then the DSC curve measured when the temperature of the wax or the toner is raised at 10° C./m is used.

(Flowability Improver)

A flowability improver may be added in the toner produced by the method for producing a toner according to the present invention. The flowability improver is incorporated onto the surface of the toner to improve the flowability thereof.

Examples of the flowability improver include carbon black; fluorine-based resin powders such as fluorinated vinylidene fine powder and polytetrafluoroethylene fine powder; silica fine powders such as wet-process silica and dry-process silica; titanium oxide fine powder, alumina fine powder, and surface-treated silica powders, surface-treated titanium oxide and surface-treated alumina each of which is prepared by subjecting titanium oxide fine powder or alumina fine powder to a surface treatment with a silane coupling agent, titanium coupling agent or silicone oil. Of these, silica fine powder, titanium oxide fine powder, and alumina fine powder are preferable. Further, surface-treated silica powders each of which is prepared by subjecting alumina fine powder to a surface treatment with a silane coupling agent or silicone oil are still more preferably used.

The particle size of the flowability improver is, as an average primary particle diameter, preferably 0.001 μm to 2 μm, more preferably 0.002 μm to 0.2 μm.

The silica fine powder is produced by vapor-phase oxidation of a silicon halide compound, is so-called dry-process silica or fumed silica.

As commercially available products of the silica fine powders produced by vapor-phase oxidation of a silicon halide compound, for example, AEROSIL (trade name, manufactured by Japan AEROSIL Inc.) -130, -300, -380, -TT600, -MOX170, -MOX80 and -COK84; CA-O-SIL (trade name, manufactured by Cabot Corporation) -M-5, -MS-7, -MS-75, -HS-5, -EH-5; Wacker HDK (trade name, manufactured by WACKER-CHEMIE GMBH) -N20 -V15, -N20E, -T30, and -T40; D-C FINE SILICA (trade name, manufactured by Dow Corning Co., Ltd.); and FRANSOL (trade name, manufactured by Fransil Co.).

Further, a hydrophobized silica fine powder prepared by hydrophobizing a silica fine powder produced by vapor-phase oxidation of a silicon halide compound is more preferable. It is particularly preferable to use a silica fine powder that is hydrophobized so that a hydrophobization degree measured by a methanol titration test is preferably from 30% to 80%. A silica fine powder can be hydrophobilized by being chemically or physically treated with an organic silicon compound reactive to or physically absorbed to the silica fine powder, or the like. There is a preferred method, in which a silica fine powder produced by vapor-phase oxidation of a silicon halide compound is hydrophobilized with an organic silicon compound.

Examples the organic silicon compound include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chloroethyltrichlorosilane, β-chloroethyltrichlorosilane, chloromethyldimethylchlorosilane, triorganosilylmercaptane, trimethylsilylmercaptane, triorganosilylacrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexamethyldisiloxane, 1,3-divinytetramethyldisiloxane, 1,3-diphenyltetramethyldisiloxane, and dimethylpolysiloxane having 2 to 12 siloxane units per molecule and having 0 to 1 hydroxyl group bonded to Si in the siloxane units positioned at the terminals. Further, silicone oils such as dimethylsilicone oil are exemplified. These organic silicon compounds may be used alone or in combination.

The number average particle diameter of the flowability improver is preferably 5 nm to 100 nm, and more preferably 5 nm to 50 nm.

The specific surface area of fine powder of the flowability improver measured by the BET nitrogen absorption method is preferably 30 m$^2$/g or more, and more preferably 60 m$^2$/g to 400 m$^2$/g. In the case of surface treated fine powder of the flowability improver, the specific surface area is preferably 20 m$^2$/g or more, and more preferably 40 m$^2$/g to 300 m$^2$/g.

The use amount of the fine powder is preferably 0.03 parts by mass to 8 parts by mass relative to 100 parts by mass of toner particles.

To the toner produced by the method for producing a toner according to the present invention, other additives can be suitably added in accordance with the necessity, for the purpose of protecting a latent electrostatic image bearing member and carrier, improving cleaning ability, controlling thermal property, electric property, and physical property, controlling resistance property, controlling softening point, and improving fixing rate. Examples of the other additives include various metal soaps, fluoride surfactants, dioctyl phthalate; conductivity imparting agents such as tin oxides, zinc oxides, carbon black, and antimony oxides; and inorganic fine powders such as titanium oxides, aluminum oxides, and aluminas. These inorganic fine powders may be hydrophobized as necessary.

Specific examples of the inorganic fine particles include silica, alumina, titanium oxide, barium titanate, magnesium titanate, calcium titanate, strontium titanate, zinc oxide, tin oxide, quartz sand, clay, mica, wollastonite, diatomaceous earth, chromium oxide, cerium oxide, red iron oxide, antimony trioxide, magnesium oxide, zirconium oxide, barium sulfate, barium carbonate, calcium carbonate, silicon carbide, and silicon nitride. The primary particle diameter of these inorganic fine particles is preferably 0.5 μm to 2 μm, and particularly preferably 5 μm to 500 μm. The proportion in which these inorganic fine particles are used is preferably 0.01% by mass to 5% by mass, and particularly preferably 0.01% by mass to 2.0% by mass, relative to the toner.

In addition, polymer fine particles may be used, such as methacrylic ester or acrylic ester copolymers or polystyrene obtained by soap-free emulsion polymerization, suspension polymerization or dispersion polymerization; polycondensates of silicone, benzoguanamine, nylon, and the like; and polymer particles produced from thermosetting resins.

Such fluidizers can be surface treated to make them hydrophobic, which prevents the flowability and charge properties from degradation even under high humidity. Examples of the surface treatment include silane coupling agents, silylation agents, silane coupling agents having a fluoroalkyl group, organic titanate-based coupling agents, aluminum-based coupling agents, silicone oils, and modified silicone oils.

As the cleanability improver for improving removability of residual toner remaining on a latent electrostatic image bearing member and a primary transfer member after transferring the toner onto a recording paper sheet or the like, for example, fatty acid metal salts such as zinc stearate, calcium stearate, and stearic acid; and polymer fine particles produced by soap-free emulsion polymerization, such as polymethylmethacrylate fine particles and polystyrene fine particles are exemplified. The polymer fine particles preferably have a relatively narrow particle size distribution and a volume average particle diameter of 0.01 μm to 1 μm.

In addition, it is possible to use a small amount of abrasive such as cesium oxides, silicon carbides, and strontium titanate; and caking protecting agents. Besides, white fine particles and black fine particles having a reverse polarity to that of toner particles can be further added as developing property improving agent.

It is also preferable that each of these additives be treated with treatment agents such as silicone varnish, various types of modified-silicone varnish, silicone oil, various types of silicone oil, silane coupling agent, silane coupling agent having a functional group, treatment agents such as other organic silicon compounds or other types of treatment agents, for the purpose of controlling the charge amount of the toner.

When a developer is prepared, an inorganic fine particle and the like can be mixed with the toner. The mixing can be performed with a mixer selected from commonly used mixers for powder. The mixer is preferably equipped with a jacket and the like so that the internal temperature of the mixer can be controlled. To change the history of a load applied to the external additive, the external additive may be added gradually or at once during mixing, the number of rotation, rotational speed, time, temperature, etc. of the mixer may be changed. Firstly a strong load may be applied to the external additive, and then a relatively weak load may be applied. Alternatively, the load may be applied in reverse order. Examples of the usable mixers include a V-type mixer, rocking mixer, LOEDIGE mixer, NAUTA mixer, HENSCHEL mixer.

A method for adjusting the shape of the obtained toner is not particularly limited, and may be appropriately selected depending on the intended purpose. For example, the toner material containing the binder resin and the colorant is melted and kneaded, and finely pulverized, and then formed into a toner, with mechanically adjusting its shape with a hybridizer, mechanofusion, etc.; a toner material is dissolved and dispersed in a solvent in which a toner binder can be solubilized, and then the solvent is removed using a spray dry device so as to obtain a spherical toner, (so-called spray dry method); and a toner is heated in an aqueous medium so as to form a spherical toner.

EXAMPLES

Next, the formulation of the solution or dispersion liquid used in Examples will be described. All percentages and parts are based on mass unless indicated otherwise.

The ejection conditions were as described above.

(Preparation of Colorant Dispersion Liquid)

Firstly, as a colorant, a dispersion liquid of carbon black was prepared.

Specifically, 17 parts of carbon black (REGAL 400, manufactured by Cabot Corporation) and 3 parts of a pigment dispersant were added to 80 parts of ethyl acetate, and primarily dispersed using a mixer having a stirring blade to obtain a primary dispersion liquid. As the pigment dispersant, AJISPER PB821 (manufactured by Ajinomoto Fine-Techno Co., Inc.) was used. The obtained primary dispersion liquid was finely dispersed under strong shearing force using a DYNO MILL to prepare a secondary dispersion liquid in which aggregates having a size of 5 μm or more were completely removed.

(Preparation of Wax Dispersion Liquid)

Next, a wax dispersion liquid was prepared.

Specifically, 18 parts of a carnauba wax and 2 parts of a wax dispersant were added to 80 parts of ethyl acetate and primarily dispersed using a mixer having a stirring blade to prepare a primary dispersion liquid. The primary dispersion liquid was heated to 80° C. with stirring to dissolve the carnauba wax therein, and then the temperature of the primary dispersion liquid was decreased to room temperature to precipitate wax particles so as to have a maximum diameter of 3 μm or less. As the wax dispersant, the one prepared by grafting a styrene-butyl acrylate copolymer on a polyethylene wax was used. The obtained dispersion liquid was further finely dispersed under strong shearing force using a DYNO MILL so as to prepare a wax dispersion liquid having a maximum diameter of 1 μm or less.

(Preparation of Solution or Dispersion Liquid)

Next, a toner composition dispersion liquid, in which a binder resin, the colorant dispersion liquid and the wax dispersion liquid were added, composed of the following composition was prepared.

Specifically, 100 parts of a polyester resin as a binder resin, 30 parts of the colorant dispersion liquid, 30 parts of the wax dispersion liquid, and 840 parts of ethyl acetate were stirred for 10 minutes using a mixer having a stirring blade so as to be uniformly dispersed. The pigment or wax particles were not aggregated by solvent dilution.

(Toner Production Apparatus)

A toner was produced by using a toner production apparatus 200 having the structure shown in FIG. 5, and a film vibration-type droplet ejecting unit having the structure shown in FIG. 10.

The size of each of the structures was as follows: the outer diameter of the frame of the droplet ejecting member 201 including the droplet ejecting unit 53 was 26 mm, the thin film 41 was a nickel plate having a diameter of 20 mm and a thickness of 40 μm. Each of holes 12 had a diameter of 10 μm, and 100 nozzle holes were formed in a central area having a diameter of 1 mm of the thin film 41. The piezoelectric element 30 had an outer diameter of 15.0 mm, an inner diameter of 4.0 mm, and a thickness of 0.5 mm. The electrode 31 was formed of a silver paste. As the drive signal generating source

34, Function Generator WF1973 manufactured by NF Corporation was used, and the circuit 35 was connected to a vibration generating unit with a lead wire coated with polyethylene.

The shroud cover 21 had a diameter of 50 mm, and the opening had a diameter of 10 mm. The chamber 19 had a cylindrical shape having an inner diameter of 300 mm and a height of 2,000 mm, was vertically fixed, and the upper end and lower end of the chamber 19 were narrowed. The inlet of the secondary transport air flow had a diameter of 50 mm, and the guide pipe had a diameter of 50 mm. Eight droplet ejecting members 201 were fixed at regular intervals with facing each other in a position of 300 mm below from the upper end and in the side wall of the chamber 19, at an angle of 90 degrees with respect to the secondary transport air flow 201, so as to eject droplets toward the center portion of the chamber.

Example 1

Using the toner production apparatus, the prepared toner composition liquid was ejected. The droplets were ejected under the conditions: input signal: 52 kHz (sine wave), 18.6 Vp-p. The velocity of the droplets immediately after ejected under such conditions was measured by using a laser shadowgraphy. The average velocity was 6.7 m/s. Under the conditions that the primary transport air flow was 7.0 m/s and the secondary transport air flow was 10.0 m/s, toner particles were dried and solidified in the chamber, and then collected. From the toner reservoir, toner was taken out, to thereby obtain a toner of Example 1. The particle size distribution of the toner was measured under the following measurement conditions by means of a flow particle image analyzer FPIA-2000 (manufactured by Sysmex Corporation). This process was repeated three times. Then, the toner had an average of volume average particle diameters (Dv) of 5.5 μm, an average of number average particle diameters (Dn) of 5.2 μm, and an average ratio of Dv/Dn of 1.05.

The measurement method using a flow particle image analyzer will be described below. A toner, toner particles, and external additives can be measured using a flow particle image analyzer FPIA-2000 (manufactured by Sysmex Corporation).

Tiny dusts in water are first moved by filtration so that the number of particles to be measured (e.g., circle equivalent diameter of 0.60 μm or more to less than 159.21 μm) is 20 or less per $10^{-3}$ cm$^3$ of water, followed by addition of a few droplets of nonionic surfactant (preferably CONTAMINON N, manufactured by Wako Pure Chemical Industries, Ltd.) and 5 mg of a sample to 10 ml of the water. The mixture is then dispersed using a distributed machine (UH-50, manufactured by SMT Co., Ltd.) for 1 minute at 20 kHz and 50 W/10 cm$^3$. Further, the dispersion treatment was performed for 5 minutes in total, preparing a sample dispersion liquid with a particle concentration of $4,000/10^{-3}$ cm$^3$ to $8,000/10^{-3}$ cm$^3$ (particles having a circle equivalent diameter of 0.60 μm or more to less than 159.21 μm). The particle size distribution of these particles is then determined as follows.

The sample dispersion liquid is allowed to flow through a flat, transparent flow cell (thickness: about 200 μm) that extends in the flow direction. A flash lamp and a CCD camera are arranged on opposite sides of the flow cell to establish an optical path that crosses the flow cell. While the sample dispersion liquid is running, a strobe light flashes at 1/30-second intervals to obtain a 2D image of each particle in the flow cell at a parallel range. By calculating the diameter of a circle that has the same area as the 2D image, the circle equivalent diameter of the particle is determined.

The circle equivalent diameters of 1,200 or more particles can be determined in about 1 minute, and the number and proportion (% by number) of particles having a specified circle equivalent diameter can be determined on the basis of the circle equivalent diameter distribution. Measurement results (frequency % and accumulation %) can be obtained by dividing a particle size range (0.06 µM to 400 µm) into 226 channels (30 channels per octave). In actual measurements, particles having a circle equivalent diameter of 0.60 µm or more to less than 159.21 µm are subjected to measurements.

Example 2

A toner was produced in the same manner as in Example 1, except that the flow velocity of the secondary transport air flow was 3.5 m/s. The particle size distribution of the obtained toner was measured in the same manner as in Example 1. Then, the toner had an average of volume average particle diameters (Dv) of 6.0 µm, an average of number average particle diameters (Dn) of 5.3 µm, and an average ratio of Dv/Dn of 1.13.

Example 3

A toner was produced in the same manner as in Example 1, except that the flow velocity of the secondary transport air flow was 20.5 m/s. The particle size distribution of the obtained toner was measured in the same manner as in Example 1. Then, the toner had an average of volume average particle diameters (Dv) of 6.1 µm, an average of number average particle diameters (Dn) of 5.3 µm, and an average ratio of Dv/Dn of 1.15.

Example 4

A toner of Example 4 was produced in the same manner as in Example 1, except that the direction of the secondary transport air flow, which vertically flowed from upside to downside, was not changed, but the fixation angle of the droplet ejecting member was changed so that a smaller angle of angles formed between a velocity vector of the primary transport air flow and a velocity vector of the secondary transport air flow became 60 degrees. The particle size distribution of the obtained toner was measured in the same manner as in Example 1. Then, the toner had an average of volume average particle diameters (Dv) of 5.8 µm, an average of number average particle diameters (Dn) of 5.2 µm, and an average ratio of Dv/Dn of 1.11.

Example 5

A toner of Example 5 was produced in the same manner as in Example 1, except that the direction of the secondary transport air flow, which vertically flowed from upside to downside, was not changed, but the fixation angle of the droplet ejecting member was changed so that a smaller angle of angles formed between a velocity vector of the primary transport air flow and a velocity vector of the secondary transport air flow became 45 degrees. The particle size distribution of the obtained toner was measured in the same manner as in Example 1. Then, the toner had an average of volume average particle diameters (Dv) of 6.2 µm, an average of number average particle diameters (Dn) of 5.4 µm, and an average ratio of Dv/Dn of 1.15.

Example 6

A toner of Example 6 was produced in the same manner as in Example 1, except that the direction of the secondary transport air flow, which vertically flowed from upside to downside, was not changed, but the fixation angle of the droplet ejecting member was changed so that a smaller angle of angles formed between a velocity vector of the primary transport air flow and a velocity vector of the secondary transport air flow became 40 degrees. The particle size distribution of the obtained toner was measured in the same manner as in Example 1. Then, the toner had an average of volume average particle diameters (Dv) of 6.4 µm, an average of number average particle diameters (Dn) of 5.4 µm, and an average ratio of Dv/Dn of 1.19.

Comparative Example 1

A toner of Comparative Example 1 was produced under the same conditions as in Example 1, except that the primary transport air flow and the secondary transport air flow were not used in the toner production apparatus used in Example 1. The particle size distribution of the obtained toner was measured in the same manner as in Example 1. Then, the toner had an average of volume average particle diameters (Dv) of 7.2 µm, an average of number average particle diameters (Dn) of 5.7 µm, and an average ratio of Dv/Dn of 1.25.

Comparative Example 2

A toner of Comparative Example 2 was produced in the same manner as in Example 1, except that the flow velocity of the secondary transport air flow was 0 m/s, namely, only the primary transport air flow was used without using the secondary transport air flow. The particle size distribution of the obtained toner was measured in the same manner as in Example 1. Then, the toner had an average of volume average particle diameters (Dv) of 6.5 µm, an average of number average particle diameters (Dn) of 5.4 µm, and an average ratio of Dv/Dn of 1.20.

Comparative Example 3

A toner of Comparative Example 3 was produced in the same manner as in Example 1, except that the direction of the secondary transport air flow, which vertically flowed from upside to downside, was not changed, but the fixation angle of the droplet ejecting member was changed so that a smaller angle of angels formed between a velocity vector of the primary transport air flow and a velocity vector of the secondary transport air flow became 120 degrees. The toner composition liquid adhered to a head serving as the droplet ejecting unit immediately after ejection was started, and the ejection was stopped. Thus, a toner could not be stably produced.

As can be seen from the above description, the particle size distribution of a toner can be stably narrowed by the method for producing a toner for developing an electrostatic image, in which the ejected droplets are transported by the primary transport air flow flowing in the same direction in which the droplets are ejected, and is further transported by the secondary transport air flow, which transports the ejected droplets in a different direction from a direction in which the primary transport air flow flows, and a velocity vector of the primary transport air flow and a velocity vector of the secondary transport air flow form a certain degrees.

What is claimed is:

1. A method for producing resin particles, comprising:
    ejecting, into a chamber, a liquid containing at least a resin in the form of droplets from a droplet ejecting unit having a plurality of holes provided in a part of a flow channel for feeding the liquid containing at least a resin, wherein a plurality of the droplet ejecting units are arranged in a side wall of the chamber to eject droplets toward the center of the chamber, and wherein at least a portion of the liquid containing at least the resin fed from a liquid container to the droplet ejecting unit is circulated between the liquid container and the droplet ejecting unit and back to the liquid container; and
    drying and solidifying the ejected droplets so as to obtain the resin particles, while the ejected droplets are transported by a primary transport air flow flowing in the direction in which the droplets are ejected,
    wherein the ejected droplets are further transported by a secondary transport air flow which transports the ejected droplets in a different direction from a direction in which the primary transport air flow flows, wherein the secondary transport air flow flows from upside to downside, and
    wherein a smaller angle of angles formed between a velocity vector of the primary transport air flow and a velocity vector of the secondary transport air flow is less than 120 degrees.

2. The method for producing resin particles according to claim 1, wherein the smaller angle of angles formed between the velocity vector of the primary transport air flow and the velocity vector of the secondary transport air flow is 45 degrees to 100 degrees.

3. The method for producing resin particles according to claim 1, wherein the smaller angle of angles formed between the velocity vector of the primary transport air flow and the velocity vector of the secondary transport air flow is 60 degrees to 90 degrees.

4. The method for producing resin particles according to claim 1, wherein a ratio V/H of a velocity V of the secondary transport air flow to a velocity H of the primary transport air flow is 0.5 to 3.0.

5. A method for producing a toner for developing an electrostatic image, comprising:
    ejecting a solution or dispersion liquid in the form of droplets from a droplet ejecting unit having a plurality of holes provided in a part of a flow channel for feeding the solution or dispersion liquid, the solution or dispersion liquid comprising a solvent and a toner material containing at least a binder resin and a pigment, dissolved or dispersed in the solvent, wherein a plurality of the droplet ejecting units are arranged in a side wall of the chamber to eject droplets toward the center of the chamber, and wherein at least a portion of the liquid containing at least the binder resin and pigment fed from a liquid container to the droplet ejecting unit is circulated between the liquid container and the droplet ejecting unit and back to the liquid container; and
    drying and solidifying the ejected droplets so as to obtain a toner, while the ejected droplets are transported by a primary transport air flow flowing in the direction in which the droplets are ejected,
    wherein the ejected droplets are further transported by a secondary transport air flow which transports the ejected droplets in a different direction from a direction in which the primary transport air flow flows, wherein the secondary transport air flow flows from upside to downside, and
    wherein a smaller angle of angles formed between a velocity vector of the primary transport air flow and a velocity vector of the secondary transport air flow is less than 120 degrees.

6. The method for producing a toner for developing an electrostatic image according to claim 5, wherein the smaller angle of angles formed between the velocity vector of the primary transport air flow and the velocity vector of the secondary transport air flow is 45 degrees to 100 degrees.

7. The method for producing a toner for developing an electrostatic image according to claim 5, wherein the smaller angle of angles formed between the velocity vector of the primary transport air flow and the velocity vector of the secondary transport air flow is 60 degrees to 90 degrees.

8. The method for producing a toner for developing an electrostatic image according to claim 5, wherein a ratio V/H of a velocity V of the secondary transport air flow to a velocity H of the primary transport air flow is 0.5 to 3.0.

9. The method for producing a toner for developing an electrostatic image according to claim 5, wherein the solvent is ethyl acetate.

10. The method for producing a toner for developing an electrostatic image according to claim 5, wherein the binder resin is a polyester resin.

11. The method for producing a toner for developing an electrostatic image according to claim 5, wherein the pigment is carbon black.

12. The method for producing a toner for developing an electrostatic image according to claim 5, wherein the toner material further comprises wax.

13. The method for producing a toner for developing an electrostatic image according to claim 12, wherein the wax is a carnauba wax.

14. The method of claim 1, wherein the droplet ejecting unit comprises a shroud generating the primary transport air flow.

15. The method of claim 5, wherein the droplet ejecting unit comprises a shroud generating the primary transport air flow.

* * * * *